(12) United States Patent
Hsieh et al.

(10) Patent No.: US 12,451,960 B2
(45) Date of Patent: Oct. 21, 2025

(54) INTERSATELLITE IMAGING DATA TRANSFER

(71) Applicant: Microsoft Technology Licensing, LLC, Redmond, WA (US)

(72) Inventors: Tsu-Wang Hsieh, Redmond, WA (US); Behnaz Arzani, Redmond, WA (US); Peder Andreas Olsen, Redmond, WA (US); Ranveer Chandra, Kirkland, WA (US); Chenning Li, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 18/306,856

(22) Filed: Apr. 25, 2023

(65) Prior Publication Data
US 2024/0364418 A1    Oct. 31, 2024

(51) Int. Cl.
*H04B 7/185* (2006.01)

(52) U.S. Cl.
CPC ..... *H04B 7/18521* (2013.01); *H04B 7/18584* (2013.01); *H04B 7/18586* (2013.01)

(58) Field of Classification Search
CPC ............ H04B 7/18521; H04B 7/18584; H04B 7/18586
See application file for complete search history.

(56) References Cited

U.S. PATENT DOCUMENTS

| | | | |
|---|---|---|---|
| 2017/0188322 A1* | 6/2017 | Calmettes | G01S 5/0231 |
| 2022/0345210 A1 | 10/2022 | Palermo | |
| 2022/0360518 A1* | 11/2022 | McCormick | H04L 41/0806 |
| 2023/0058040 A1* | 2/2023 | Nevius | B64G 3/00 |
| 2024/0253826 A1* | 8/2024 | Guiney | G06F 3/04847 |
| 2024/0253827 A1* | 8/2024 | Guiney | G06F 3/0484 |
| 2024/0302532 A1* | 9/2024 | Reid | G01S 19/05 |

OTHER PUBLICATIONS

International Search Report and Written Opinion received for PCT Application No. PCT/US2024/023480, Sep. 16, 2024, 18 pages.

(Continued)

*Primary Examiner* — Abdelnabi O Musa
(74) *Attorney, Agent, or Firm* — Alleman Hall & Tuttle LLP

(57) ABSTRACT

A computing device including a processor configured to receive satellite status data from satellites included in a satellite constellation. The processor is further configured to determine a link topology of the satellites. Based at least in part on the satellite status data and the link topology, the processor is further configured to identify a first satellite constellation subset including one or more selected satellite pairs. Identifying the one or more selected satellite pairs includes computing respective link utility values associated with a plurality of candidate pairs of satellites included in the satellite constellation based at least in part on the satellite status data and the link topology. The one or more selected satellite pairs are selected based at least in part on the link utility values. The processor is further configured to transmit, to the satellites included in the first satellite constellation subset, instructions to perform intersatellite imaging data transfer.

20 Claims, 14 Drawing Sheets

(56) References Cited

OTHER PUBLICATIONS

Zhu, et al., "So2Sat LCZ42: A Benchmark Dataset for Global Local Climate Zones Classification", In Repository of arXiv:1912.12171v1, Dec. 19, 2019, 12 Pages.

Li, et al., "Federated Learning Systems: Vision, Hype and Reality for Data Privacy and Protection", In Repository of arXiv:1907.09693v1, Jul. 23, 2019, 7 Pages.

Li, et al., "PyramidFL: Fine-grained data and system heterogeneity-aware client selection for efficient federated learning", In Proceedings of the ACM MobiCom, Oct. 17, 2022, pp. 158-171.

Lu, et al., "Differentially Private Asynchronous Federated Learning for Mobile Edge Computing in Urban Informatics", In Journal of IEEE Transactions on Industrial Informatics, vol. 16, Issue 3, Sep. 18, 2019, pp. 2134-2143.

Magazine, et al., "A Note on Approximation Schemes for Multidimensional Knapsack Problems", In Journal of Mathematics of Operations Research, vol. 9, Issue 2, May 1984.

McMahan, et al., "Communication-Efficient Learning of Deep Networks from Decentralized Data", In Proceedings of the 20th International Conference on Artificial Intelligence and Statistics, Apr. 10, 2017, 10 Pages.

Moision, et al., "Deep-Space Optical Communications Downlink Budget: Modulation and Coding", In Journal of IPN Progress Report, vol. 42, Issue 154, Aug. 15, 2003, 28 Pages.

Ippolito, Louis J., "Radiowave Propagation in Satellite Communications", In Publication of Springer, Dec. 6, 2012.

Nguyen, et al., "Federated Learning with Buffered Asynchronous Aggregation", In Repository of arXiv:2106.06639v1, Jun. 11, 2021, 25 Pages.

Padwick, et al., "Worldview-2 Pan-Sharpening", In Proceedings of the American Society for Photogrammetry and Remote Sensing, Apr. 26, 2010, 14 Pages.

Paoletta, Patricia, "Application for Fixed Satellite Service by Space Exploration Holdings, LLC", Retrieved From: https://fcc.report/IBFS/SAT-LOA-20170726-00110, Retrieved Date: Sep. 26, 2022, 6 Pages.

Razmi, et al., "Ground-Assisted Federated Learning in LEO Satellite Constellations", In Journal of IEEE Wireless Communications Letters, vol. 11, Issue 4, Jan. 7, 2022, pp. 717-721.

Ronneberger, et al., "U-Net: Convolutional Networks for Biomedical Image Segmentation", In Proceedings of the Medical Image Computing and Computer-Assisted Intervention, Oct. 5, 2015, pp. 234-241.

Safyan, Mike, "Planet's Dove Satellite Constellation", In Journal of Handbook of Small Satellites: Technology, Design, Manufacture, Applications, Economics and Regulation, Jan. 20, 2020.

Shukla, et al., "Enhancing Access and Usage of Earth Observations in Environmental Decision-Making in Eastern and Southern Africa Through Capacity Building", In Journal of Frontiers in Sustainable Food Systems, vol. 5, Apr. 13, 2021, 16 Pages.

So, et al., "FedSpace: An Efficient Federated Learning Framework at Satellites and Ground Stations", In Repository of arXiv:2202.01267v1, Feb. 2, 2022, 11 Pages.

So, et al., "Secure Aggregation For Buffered Asynchronous Federated Learning", In Repository of arXiv:2110.02177v1, Oct. 5, 2021, 12 Pages.

Sprague, et al., "Asynchronous Federated Learning for Geospatial Applications", In Proceedings of the In Joint European Conference on Machine Learning and Knowledge Discovery in Databases, Sep. 10, 2018, 8 Pages.

Sumbul, et al., "BigEarthNet-MM: A Large-Scale, Multimodal, Multilabel Benchmark Archive for Remote Sensing Image Classification and Retrieval [Software and Data Sets]", In Journal of IEEE Geoscience and Remote Sensing Magazine, vol. 9, Issue 3, Sep. 29, 2021, pp. 174-180.

Vasisht, et al., "L2D2: Low Latency Distributed Downlink for Low Earth Orbit Satellites", In Proceedings of the ACM SIGCOMM Conference, Aug. 23, 2021, pp. 151-164.

Wang, et al., "A Model, a Heuristic and a Decision Support System to Solve The Scheduling Problem of an Earth Observing Satellite Constellation", In Journal of Computers & Industrial Engineering, vol. 61, Issue 2, Feb. 24, 2011, pp. 322-335.

Wang, et al., "Adaptive Federated Learning in Resource Constrained Edge Computing Systems", In Journal of IEEE journal on selected areas in communications, vol. 37, Issue 6, Mar. 10, 2019, pp. 1205-1221.

Werner, Debra, "Planet Pelicans to offer high resolution and revisit rates", Retrieved From: https://spacenews.com/planet-pelican-details/, Apr. 21, 2022, 4 Pages.

Xie, et al., "Asynchronous Federated Optimization", In Repository of arXiv:1903.03934v1, Mar. 10, 2019, 10 Pages.

Xu, et al., "Asynchronous Federated Learning on Heterogeneous Devices: A Survey", In Repository of arXiv:2109.04269v1, Sep. 9, 2021, 25 Pages.

Zech, et al., "Optical Intersatellite Links for Navigation Constellations", In Proceedings of the International Conference on Space Optics, Oct. 9, 2018, 10 Pages.

Zhang, et al., "Federated Learning for the Internet of Things: Applications, Challenges, and Opportunities", In Journal of IEEE Internet of Things Magazine, vol. 5, Issue 1, Mar. 2022, pp. 24-29.

Zhao, et al., "Stochastic Optimization with Importance Sampling for Regularized Loss Minimization", In Proceedings of the 32nd International Conference on Machine Learning, Jun. 1, 2015, 9 Pages.

Zhu, Xiaojinj., "Semi-Supervised Learning Literature Survey", In Technical Report of Computer Sciences Department, Sep. 2005, 39 Pages.

"Modis Overview", Retrieved From: https://lpdaac.usgs.gov/data/get-started-data/collection-overview/missions/modis-overview/#modis-spectral-bands, Retrieved Date: Apr. 6, 2023, 10 Pages.

"Multispectral Imaging", Retrieved From: https://en.wikipedia.org/wiki/Multispectral_imaging, Jan. 29, 2023, 7 Pages.

"Satellite Imagery", Retrieved From: https://en.wikipedia.org/wiki/Satellite_imagery, Mar. 4, 2023, 8 Pages.

"Application for Fixed Satellite Service by WorldVu Satellites Limited", Retrieved From: https://fcc.report/IBFS/SAT-MOD-20180319-00022, Retrieved Date: Sep. 26, 2022, 5 Pages.

"AWS Ground Station", Retrieved From: https://aws.amazon.com/ground-station/, Retrieved Date: Sep. 26, 2022, 9 Pages.

"CubeSat Laser Communication Transmitter", Retrieved From: https://satsearch.co/products/tesat-cubelct, Retrieved Date: Sep. 26, 2022, 2 Pages.

"Dove Satellite Constellation", Retrieved From: https://www.satimagingcorp.com/satellite-sensors/other-satellite-sensors/dove-3m/, Retrieved Date: Sep. 26, 2022, 7 Pages.

"ETCI 2021 Competition on Flood Detection", Retrieved From: https://nasa-impact.github.io/etci2021/, Retrieved Date: Sep. 26, 2022, 7 Pages.

"Flock 3p-49", Retrieved From: https://in-the-sky.org/spacecraft.php?id=42001, Retrieved Date: Sep. 26, 2022, 3 Pages.

"High-Resolution Imagery with Planet Satellite Tasking", Retrieved From: https://www.planet.com/products/hi-res-monitoring/, Retrieved Date: Sep. 26, 2022, 38 Pages.

"Jetson TX2 Module", Retrieved From: https://developer.nvidia.com/embedded/jetson-tx2, Retrieved Date: Sep. 26, 2022, 4 Pages.

"Planet", Retrieved From: http://celestrak.org/NORAD/elements/table.php?GROUP=planet&FORMAT=tle, Retrieved Date: Sep. 26, 2022, 1 Page.

"Planet Analytic Imagery and Archive", Retrieved From: https://www.planet.com/products/planet-imagery/, Retrieved Date: Sep. 26, 2022, 7 Pages.

"Planet Imagery Product Specifications", Retrieved From: https://assets.planet.com/docs/combined-imagery-product-spec-final-may-2019.pdf, May 2019, 99 Pages.

"Sentinel-1 SAR User Guide", Retrieved From: https://sentinel.esa.int/web/sentinel/user-guides/sentinel-1-sar, Retrieved Date: Sep. 26, 2022, 2 Pages.

"Sentinel-2 MSI User Guide", Retrieved From: https://sentinel.esa.int/web/sentinel/user-guides/sentinel-2-msi, Retrieved Date: Sep. 26, 2022, 2 Pages.

(56) References Cited

OTHER PUBLICATIONS

"Spire", Retrieved From: http://celestrak.org/NORAD/elements/table.php?GROUP=spire&FORMAT=tle, Retrieved Date: Sep. 26, 2022, 1 Page.

"Spire Global Nanosatellite Constellation", Retrieved From: https://www.eoportal.org/satellite-missions/spire-global, May 29, 2017, 85 Pages.

Alain, et al., "Variance Reduction In Sgd by Distributed Importance Sampling", In Repository of arXiv:1511.06481v7, Apr. 16, 2016, 18 Pages.

Aragon, et al., "CubeSats Enable High Spatiotemporal Retrievals of Crop-Water Use for Precision Agriculture", In Journal of Remote Sensing, vol. 10, Issue 12, Nov. 22, 2018, 22 Pages.

Barbulescu, et al., "Leap Before You Look: An Effective Strategy in an Oversubscribed Scheduling Problem", In Journal of American Association for Artificial Intelligence, vol. 4, Jul. 25, 2004, 6 Pages.

Barlow, et al., "Unsupervised learning", In Journal of Neural computation, vol. 1, Issue 3, Sep. 1, 1989, pp. 295-311.

Barmpoutis, et al., "A Review on Early Forest Fire Detection Systems Using Optical Remote Sensing", In Journal of Sensors, vol. 20, Issue 22, Nov. 11, 2020, 27 Pages.

Bhardwaj, et al., "Ekya: Continuous Learning of Video Analytics Models on Edge Compute Servers", In Proceedings of the 19th USENIX Symposium on Networked Systems Design and Implementation, Apr. 4, 2022, pp. 119-135.

Bonawitz, et al., "Towards Federated Learning at Scale: System Design", In Journal of machine learning and systems, vol. 1, Apr. 15, 2019, 15 Pages.

Cangialosi, et al., "Privid: Practical, Privacy-Preserving Video Analytics Queries", In Proceedings of the 19th USENIX Symposium on Networked Systems Design and Implementation, Apr. 4, 2022, pp. 209-228.

Chai, et al., "Fedat: A Communication-Efficient Federated Learning Method With Asynchronous Tiers Under Non-Iid Data", In Repository of arXiv:2010.05958v1, Oct. 12, 2020, 16 Pages.

Chen, et al., "Asynchronous Online Federated Learning for Edge Devices with Non-IID Data", In Proceedings of the IEEE International Conference on Big Data, Dec. 10, 2020, pp. 15-24.

Chen, et al., "Cascading and Pulse-Like Ruptures During The 2019 Ridgecrest Earthquakes In The Eastern California Shear Zone", In Journal of Nature communications, vol. 11, Issue1, Jan. 7, 2020, 8 Pages.

Chen, et al., "Satellite-Based Computing Networks with Federated Learning", In Journal of IEEE Wireless Communications, vol. 29, Issue 1, Feb. 1, 2022, pp. 78-84.

Chen, et al., "VAFL: a Method of Vertical Asynchronous Federated Learning", In Repository of arXiv:2007.06081v1, Jul. 12, 2020, 22 Pages.

Cho, et al., "FLAME: Federated Learning Across Multi-device Environments", In Repository of arXiv:2202.08922v1, Feb. 17, 2022, 25 Pages.

Christie, et al., "Functional Map of the World", In Proceedings of the IEEE Conference on Computer Vision and Pattern Recognition, Jun. 18, 2018, pp. 6172-6180.

Denby, et al., "Orbital Edge Computing: Nanosatellite Constellations as a New Class of Computer System", In Proceedings of the Twenty-Fifth International Conference on Architectural Support for Programming Languages and Operating Systems, Mar. 16, 2020, pp. 939-954.

Devaraj, Kiruthika, "Planet's Communication Network Employing agile aerospace to download 25+ TB daily imagery from the Dove constellation", Retrieved From: https://leoconn.github.io/slides/leoconn_2021_day1_kiruthika.pdf, Jun. 9, 2021, 33 Pages.

Dimitriadis, et al., "Flute: A Scalable, Extensible Framework for High-Performance Federated Learning Simulations", In Repository of arXiv:2203.13789v3, Nov. 14, 2022, 14 Pages.

Escher, Anna, "Inside Planet Labs' New Satellite Manufacturing Site", Retrieved From: https://techcrunch.com/2018/09/14/inside-planet-labs-new-satellite-manufacturing-site/, Sep. 15, 2018, 18 Pages.

Etten, et al., "SpaceNet: A Remote Sensing Dataset and Challenge Series", In Repository of arXiv:1807.01232v1, Jul. 3, 2018, 19 Pages.

Franch-Pardo, et al., "Spatial Analysis and GIS In The Study of COVID-19. A Review", In Journal of Science of the total environment, vol. 739, Oct. 15, 2020, 10 Pages.

Franklin, Dustin, "Nvidia Jetson TX2 Delivers Twice the Intelligence to the Edge", Retrieved From: https://developer.nvidia.com/blog/jetson-tx2-delivers-twice-intelligence-edge/, Mar. 7, 2017, 7 Pages.

Gabriel, et al., "Open MPI: Goals, Concept, and Design of a Next Generation MPI Implementation", In Proceedings of the Recent Advances in Parallel Virtual Machine and Message Passing Interface: 11th European PVM/MPI Users' Group Meeting, Sep. 19, 2004, pp. 97-104.

Gao, et al., "Densely Connected Convolutional Networks", In Proceedings of the IEEE conference on computer vision and pattern recognition, Jul. 21, 2017, pp. 2261-2269.

Handley, Mark, "Delay is Not an Option: Low Latency Routing in Space", In Proceedings of the 17th ACM Workshop on Hot Topics in Networks, Nov. 15, 2018, 7 Pages.

Harris, Mark, "Tech Giants Race to Build Orbital Internet [News]", In Journal of IEEE Spectrum, vol. 55, Issue 6, May 23, 2018, pp. 10-11.

He, et al., "Deep Residual Learning for Image Recognition", In Proceedings of the IEEE Conference on Computer Vision and Pattern Recognition, Jun. 27, 2016, pp. 770-778.

Hsieh, et al., "Gaia: Geo-Distributed Machine Learning Approaching LAN Speeds", In Proceedings of the 14th USENIX Symposium on Networked Systems Design and Implementation, Mar. 27, 2017, pp. 629-647.

Hsieh, et al., "The Non-IID Data Quagmire of Decentralized Machine Learning", In Proceedings of the 37th International Conference on Machine Learning, Nov. 21, 2020, 12 Pages.

Jewett, Rachel, "Next Starlink Satellites Will Have Inter-Satellite Links, Shotwell Says", Retrieved From: https://www.satellitetoday.com/broadband/2021/08/26/next-starlink-satellites-will-have-inter-satellite-links-shotwell-says/, Aug. 26, 2021, 6 Pages.

Kairouz, et al., "Advances and Open Problems in Federated Learning", In Journal of Foundations and Trends® in Machine Learning, vol. 14, Issue, 1-2, Jun. 22, 2021, 214 Pages.

Karp, Richardm. , "Reducibility Among Combinatorial Problems", In Publication of Springer, Mar. 20, 1972, pp. 85-103.

Katharopoulos, et al., "Not All Samples are Created Equal: Deep Learning with Importance Sampling", In Proceedings of the International conference on machine learning, Jul. 3, 2018, 10 Pages.

Lai, et al., "Oort: Efficient Federated Learning via Guided Participant Selection", In the Proceedings of the 15th USENIX Symposium on Operating Systems Design and Implementation, Jul. 14, 2021, pp. 19-35.

Larson, et al., "Space Mission Analysis and Design", In Publication of Springer, Jun. 1999, 19 Pages.

* cited by examiner

INTERSATELLITE IMAGING DATA TRANSFER

BACKGROUND

Recent years have seen increases in the use of nanosatellites to perform Earth observation. For example, imaging data of the Earth collected by nanosatellites may be used for applications such as weather monitoring and disaster mitigation. These nanosatellites are located in low-Earth orbit (LEO) and are typically launched in constellations that include tens or hundreds of satellites. The nanosatellites included in these constellations are configured to transmit data to ground stations. In addition, the nanosatellites may have intersatellite link capabilities that allow the satellites to send data to, and receive data from, other satellites included in the constellation.

SUMMARY

According to one aspect of the present disclosure, a computing device is provided, including a processor configured to receive satellite status data from each of a plurality of satellites included in a satellite constellation. The satellite status data is associated with a time window of a plurality of time windows. The processor is further configured to determine a link topology of the plurality of satellites at the time window. Based at least in part on the satellite status data and the link topology, the processor is further configured to identify a first satellite constellation subset including one or more selected satellite pairs. Identifying the one or more selected satellite pairs includes computing respective link utility values associated with a plurality of candidate pairs of satellites included in the satellite constellation based at least in part on the satellite status data and the link topology. Identifying the one or more selected satellite pairs further includes selecting the one or more selected satellite pairs based at least in part on the link utility values. The processor is further configured to transmit, to the satellites included in the first satellite constellation subset, instructions to perform intersatellite imaging data transfer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Nanosatellites frequently collect more imaging data of the Earth than can be transmitted from the nanosatellite to a ground station given the satellite's bandwidth constraints. The nanosatellites also have limited onboard storage with which to store the image data. Accordingly, large portions of the imaging data collected at the nanosatellite are frequently discarded prior to transmission to the ground. In some existing satellite constellations, approximately 10 times more imaging data can be collected than transmitted to ground stations given the available bandwidth of the nanosatellites.

Onboard computing capabilities of the nanosatellites may be utilized to extract useful information from imaging data that would otherwise be discarded. By pre-processing the imaging data using such onboard computing capabilities, the nanosatellites may extract features from the imaging data that are relevant to the application in which the imaging data is used.

Some recent work investigates the use of the imaging data to train machine learning (ML) models at the nanosatellites. For example, federated learning may be used at the satellite constellation and a ground-based computing device. In federated learning, the satellites individually compute sets of model updates to an ML model, and these model updates are aggregated at the ground-based computing device after the model updates are downlinked to a ground station. Aggregated model data may subsequently be uplinked from the ground station to the satellites. Thus, the local models stored at the satellites may be iteratively updated as new imaging data is collected.

Previous approaches to training ML models at satellite constellations have ignored some of the hardware limitations of the nanosatellites. However, since nanosatellites are built to have low size, mass, and energy consumption, hardware constraints on the data processing and communication capabilities of the nanosatellites frequently become relevant in real-world imaging settings. In addition, such prior approaches assume that the data samples collected by the satellites are independent identically distributed (i.i.d.) samples over the total area imaged by the satellite constellation. This assumption is also unrealistic due to inhomogeneity among regions imaged by the satellites during different portions of their orbits. Such prior approaches may accordingly result in low model performance and slow convergence.

Figure 1:
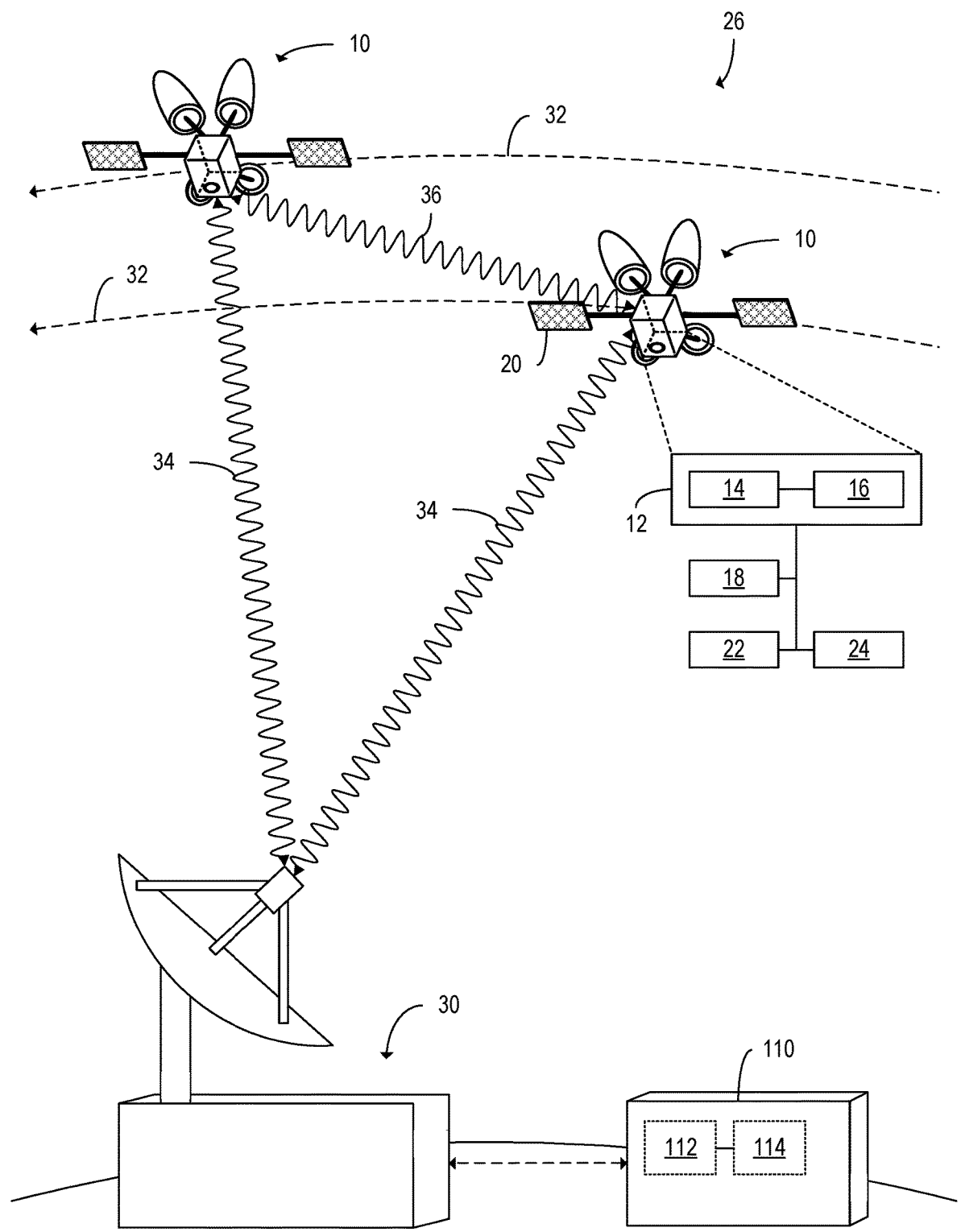
FIG. 1 schematically shows a plurality of satellites, a ground station, and a computing device, according to one example embodiment.

In order to address the above shortcomings of previous approaches to training ML models at satellite constellations, the following systems and methods are provided. FIG. 1 schematically shows a plurality of satellites 10, a ground station 30, and a computing device 110. The plurality of satellites 10 are included in a satellite constellation 26 and are configured to orbit the Earth in respective orbits 32. The satellites 10 are configured to communicate with the ground station 30 via satellite-ground-station links 34. In some examples, the satellites 10 may be configured to communicate with a plurality of different ground stations 30. The satellites 10 are also configured to communicate with each other via intersatellite links 36.

Each of the satellites 10 depicted in the example of FIG. 1 includes an onboard computing device 12, which includes a processor 14 and memory 16. The processor 14 includes one or more processing devices. For example, the processor 14 may include one or more central processing units (CPUs), graphics processing units (GPUs), and/or other types of processing devices. The memory 16 may include volatile memory and non-volatile storage.

The satellite 10 further includes an imaging sensor 18 configured to image the Earth. The imaging sensor 18 may, for example, be configured to collect radiofrequency, infrared, visible-light, or ultraviolet images. In some examples, the imaging sensor 18 may be configured to collect multispectral images in which received light is grouped into a plurality of spectral bands. Example spectral bands may include blue (approximately 450-520 nm), green (approximately 520-600 nm), red (approximately 600-690 nm), near-infrared (approximately 750-900 nm), mid-infrared (approximately 1550-1750 nm), far-infrared (approximately 2080-2350 nm), thermal infrared (approximately 10400-12500 nm), and radar frequency bands. Hyperspectral imaging, in which received light is classified into a large number (e.g., hundreds) of spectral bands may be used in some examples.

The satellite 10 further includes a photovoltaic array 20 via which the satellite 10 is configured to collect energy from sunlight. The photovoltaic array 20 is coupled to a battery 22 that is configured to store the energy and supply electrical power to other components of the satellite 10. In addition, the satellite 10 further includes a communication unit 24 via which the satellite 10 is configured to send and receive data over one or more satellite-ground-station links 34 and one or more intersatellite links 36.

The ground station 30 is configured to receive data from, and transmit data to, the satellites 10 via the satellite-ground-station links 34. In addition, the ground station 30 is configured to communicate with the computing device 110 at which that data is processed. The computing device 110 may be an on-site computing device located at the ground station 30 or may be an off-site computing device that performs cloud-based processing of data received from the satellites 10. The computing device 110 includes a processor 112 that is communicatively coupled to memory 114. The processor 112 may include one or more CPUs, GPUs, and/or other types of processing devices, and the memory 114 may include volatile memory and non-volatile storage.

Figure 2:
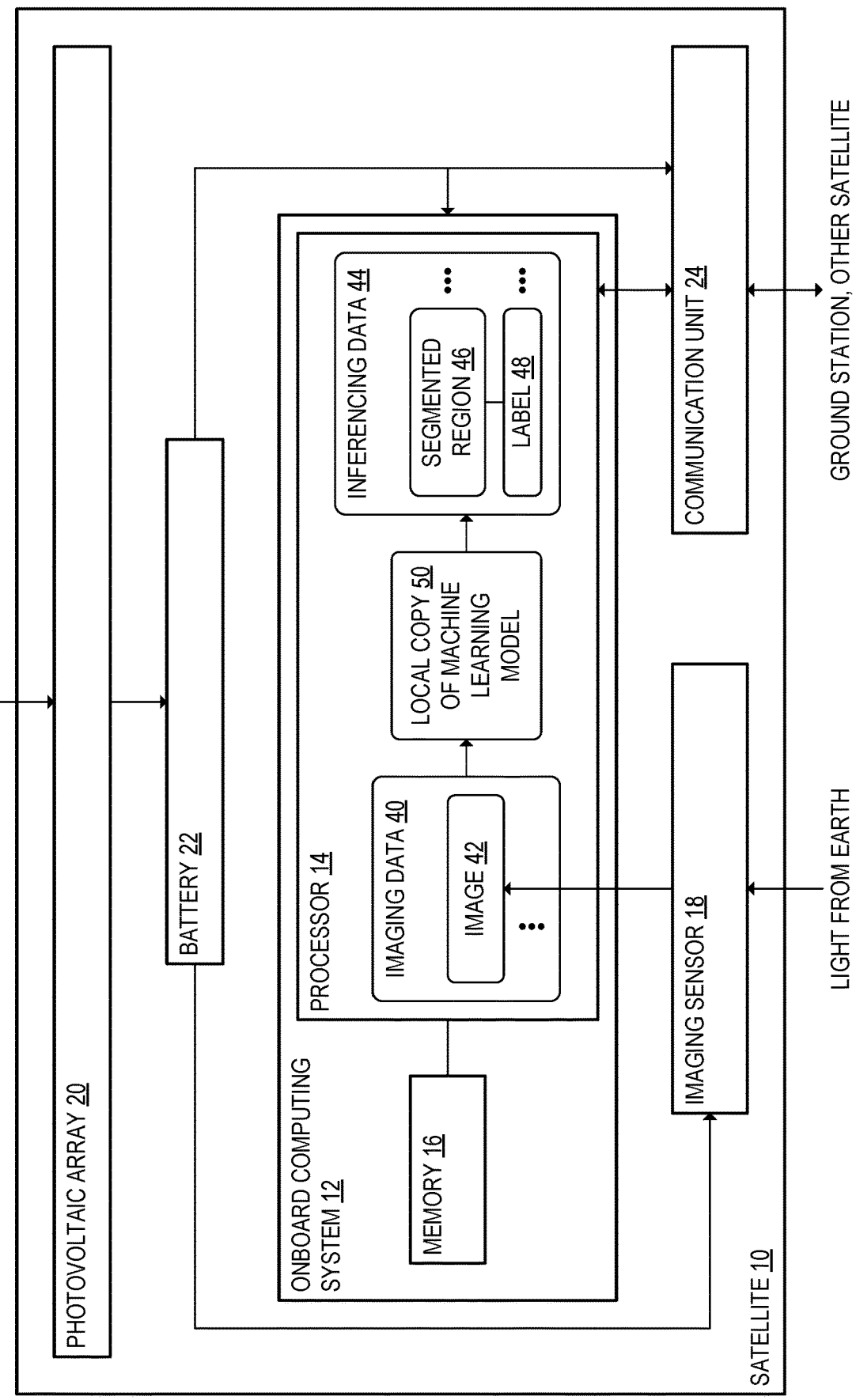
FIG. 2 schematically shows a satellite in additional detail, according to the example of FIG. 1.

FIG. 2 schematically shows a satellite 10 in additional detail, according to the example of FIG. 1. At the satellite 10, the imaging sensor 18 collects imaging data 40 by sensing light received from the Earth. The imaging data 40 includes a plurality of images 42 stored in the memory 16 of the satellite 10. In some examples, the processor 14 may be configured to preprocess the images 42, such as by compressing the images 42 to have lower resolutions or to use fewer bits per pixel to specify color.

The memory 16 of the satellite 10 further stores a local copy 50 of a machine learning model. The processor 14 is configured to iteratively train the local copy 50 of the ML model using the imaging data 40 as training data. In addition, the processor 14 may be further configured to perform inferencing at the local copy 50 of the machine learning model to generate inferencing data 44. The inferencing data 44 may include a plurality of segmented regions 46 of the images 42, and may further include a plurality of labels 48 assigned to the segmented regions 46. The processor 14 may, for example, use the local copy 50 of the machine learning model to perform unsupervised clustering of the images 42 to compute the plurality of segmented regions 46 and to assign the plurality of labels 48 to those segmented regions 46. In other examples, the machine learning model may instead be configured to perform some task other than image segmentation and labeling.

By performing inferencing using the local copy 50 of the machine learning model, the processor 14 may be configured to extract usable information from the images 42 without downlinking the images 42 in their entirety to the ground station 30. By extracting data that is relevant to a specific application of the imaging data 40 but has a smaller file size, the local copy 50 of the machine learning model is able to utilize the limited bandwidth of the satellite-ground-station link 34 more efficiently.

Figure 3A:
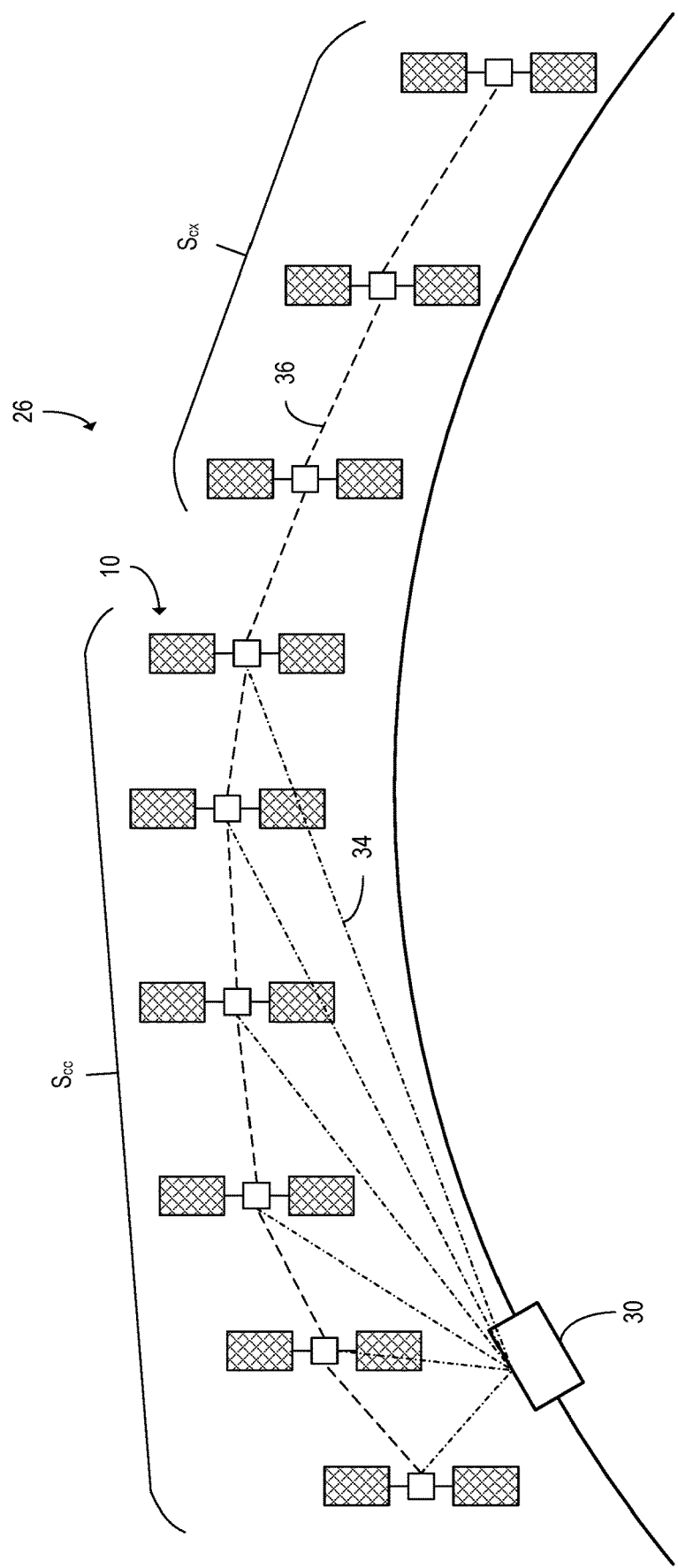
FIG. 3A schematically shows an example view of a satellite constellation that includes the plurality of satellites, according to the example of FIG. 1.

During the satellites' orbits 32 around the Earth, the satellites 10 are sometimes out of direct communication range with the ground station 30. FIG. 3A schematically shows an example view of the satellite constellation 26. In the example of FIG. 3A, the satellites 10 included in an in-range subset $S_{cc}$ of the satellite constellation 26 are within communication range of a ground station 30 and are thereby eligible to communicate with the ground station 30 via satellite-ground-station links 34. The satellite constellation 26 as shown in the example of FIG. 3A further includes an out-of-range subset $S_{cx}$ of the satellite constellation 26 that includes satellites 10 that are out of communication range with the ground station 30. The satellites 10 included in the out-of-range subset $S_{cx}$ may be within inter-satellite communication range of one or more of the satellites 10 included in the in-range subset $S_{cc}$, or may be reachable from the in-range subset $S_{cc}$ via a plurality of intersatellite links 36. Thus, the satellites 10 included in the out-of-range subset $S_{ex}$ may be configured to communicate with the ground station 30 indirectly.

Figure 3B:
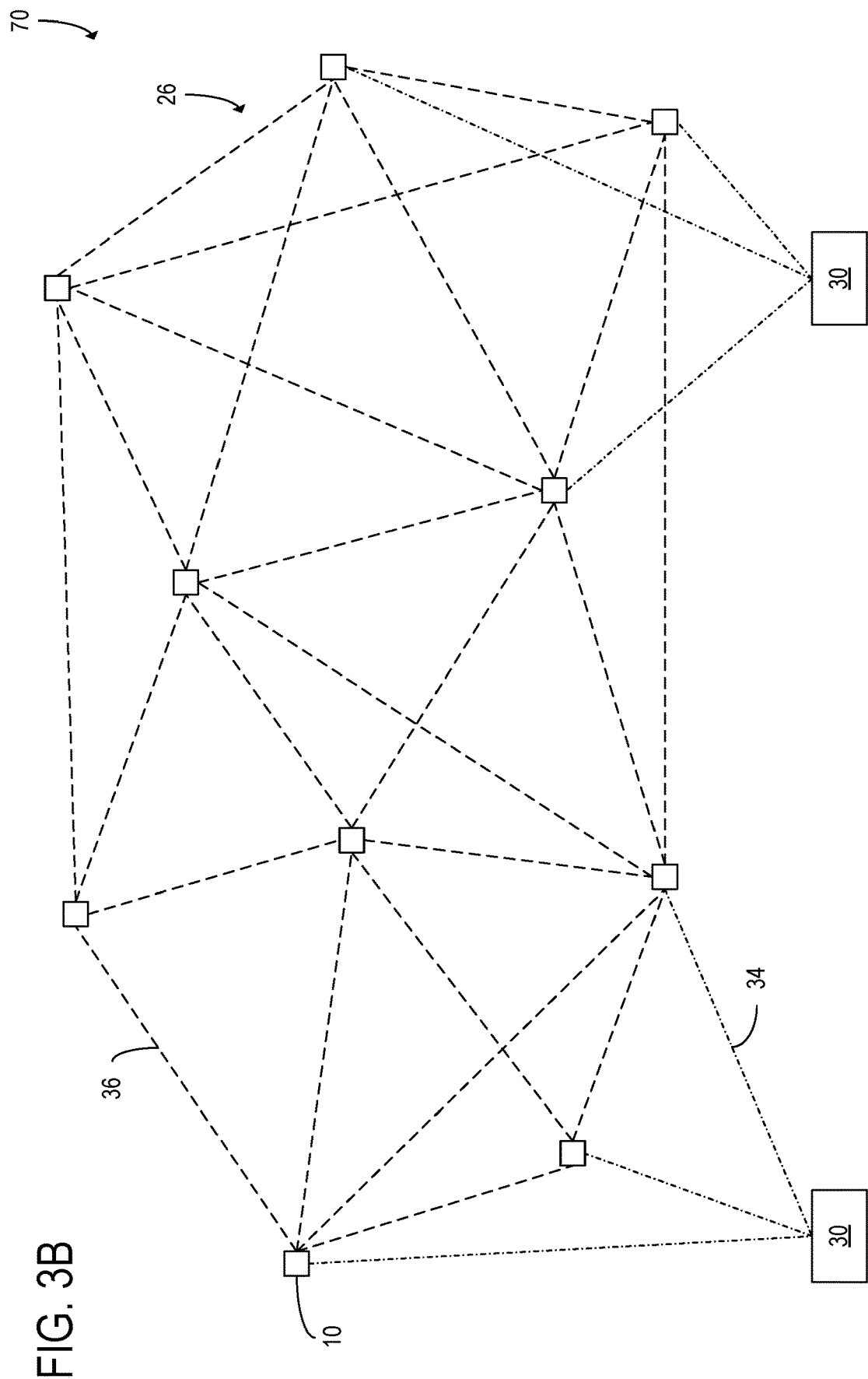
FIG. 3B schematically shows a link topology of the satellite constellation and a plurality of ground stations, according to the example of FIG. 3A.

FIG. 3B schematically shows a link topology 70 of the satellite constellation 26 and a plurality of ground stations 30, according to one example. In the example of FIG. 3B, the link topology 70 is shown as a graph in which the satellites 10 and the ground stations 30 are vertices. The satellite-ground-station links 34 and the intersatellite links 36 are the edges of the graph. Accordingly, the link topology 70 indicates which of the satellites 10 are capable of communicating directly with the ground stations 30 and/or specific other satellites 10 included in the satellite constellation 26.

Figure 4:
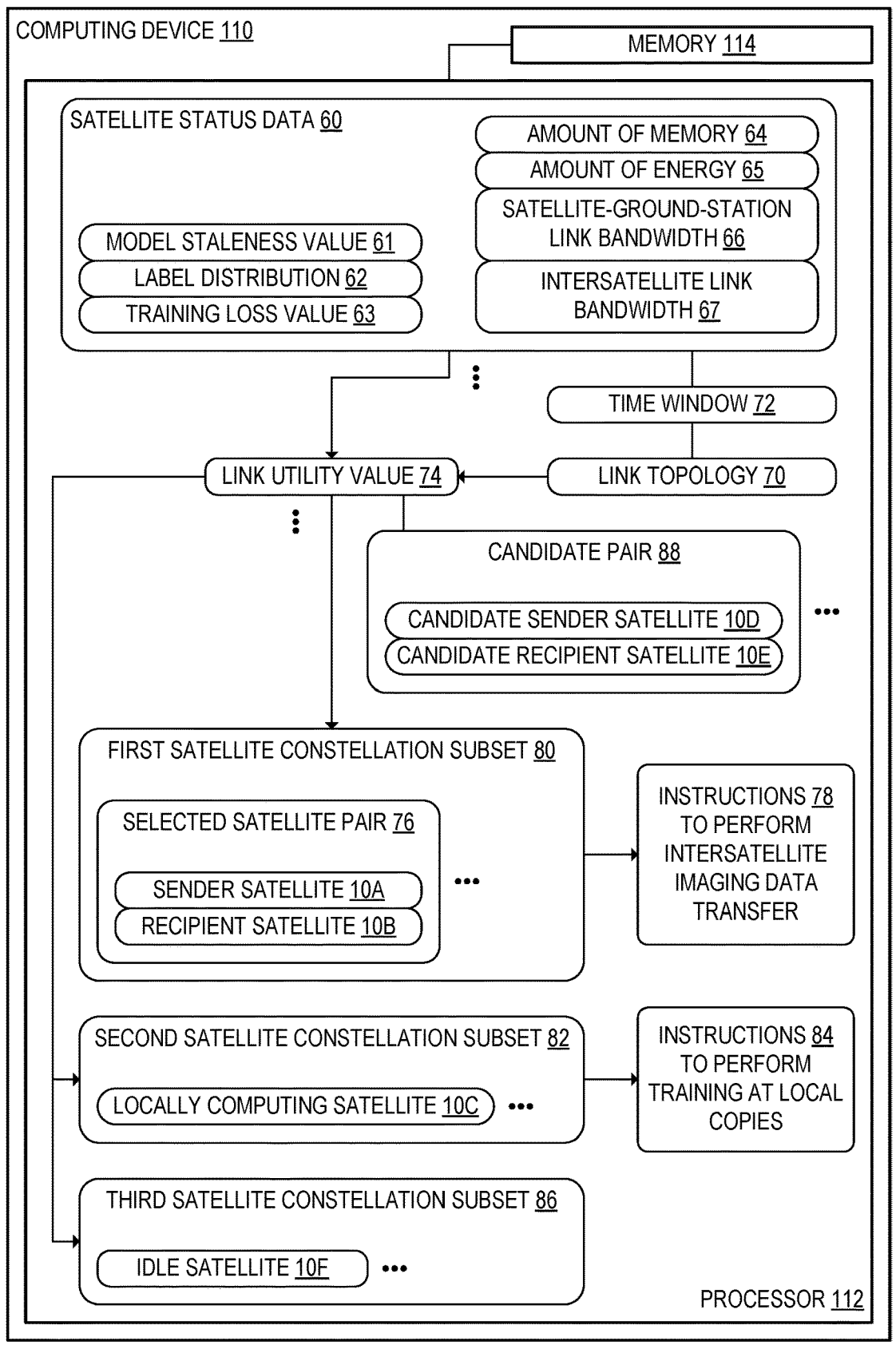
FIG. 4 schematically shows the computing device when a processor included in the computing device is configured to perform communication scheduling for the satellite constellation, according to the example of FIG. 1.

FIG. 4 schematically shows the computing device 110 in additional detail when the computing device 110 is configured to perform communication scheduling for the satellite constellation 26. The processor 112 is configured to perform the communication scheduling at each of a plurality of time windows 72. For example, the plurality of time windows 72 may each have a duration of five minutes. At the processor 112, the computing device 110 is configured to determine the link topology 70 of the plurality of satellites 10 at a time window 72 of the plurality of time windows 72. Since the orbits 32 of the satellites 10 are deterministic, the processor 112 may be configured to precompute and store a plurality of link topologies 70 that the satellite constellation 26 will have in future time windows 72. The processor 112 may be further configured to refer to the stored link topologies 70 when performing communication scheduling at those future time windows 72.

The processor 112 is further configured to receive satellite status data 60 from the plurality of satellites 10 included in the satellite constellation 26. The respective satellite status data 60 received from each satellite 10 may include data related to resource availability at that satellite 10. Additionally or alternatively, the satellite status data 60 may include data related to the training of the local copy 50 of the machine learning model at the satellite 10.

In the example of FIG. 4, for each of the plurality of satellites 10, the satellite status data 60 associated with that satellite 10 includes a model staleness value 61 of the local copy 50 of the machine learning model during the time window 72. The model staleness value 61 may be expressed as a number of time windows 72 since the local copy 50 of the machine learning model was most recently modified.

For each of the plurality of satellites 10, the satellite status data 60 associated with that satellite 10 may further include a label distribution 62 of the plurality of labels 48 computed at the local copy 50 of the machine learning model during the time window 72. The label distribution 62 may indicate, for each of a plurality of labels 48 that may be applied to segmented regions 46 of images 42, a proportion of a total area of the plurality of images 42 to which that label 48 is applied. The plurality of images 42 over which the label distribution 62 is computed may be the distribution of images 42 collected within the time window 72. Alternatively, the label distribution 62 may be computed over a set of images 42 collected across a plurality of time windows 72, e.g., in scenarios in which image labeling is delayed due to energy constraints.

In some examples, the satellite status data 60 further includes one or more respective training loss values 63 received from one or more satellites 10 of the plurality of satellites 10. The training loss values 63 may be values of a loss function used when training the local copy 50 of the machine learning model, and the one or more satellites 10 may be the satellites 10 at which the local copies 50 are updated during the time window 72. In some examples, a plurality of training loss values 63 associated with respective batches of images 42 may be computed at the satellite during the time window 72 when training the local copy 50. In such examples, the plurality of training loss values 63 may be received at the processor 112 as part of the satellite status data 60.

The satellite status data 60 may further include an amount of memory 64 available at the satellite 10 during the time window 72. The amount of memory 64 may be an available capacity of non-volatile storage included in the memory 16 of the satellite 10. Additionally or alternatively, the satellite status data 60 may further include an amount of energy 65 available at the satellite 10 during the time window 72. This amount of energy 65 may, for example, be an estimated amount of energy stored in the battery 22 at the end of the time window 72. The amount of energy 65 may be estimated at the processor 14 of the satellite 10.

The satellite status data 60 associated with the satellite 10 may further include a satellite-ground-station link bandwidth 66 and an intersatellite link bandwidth 67. In some examples, the link topology 70 may be expressed in terms of estimated values of the satellite-ground-station link bandwidth 66 and the intersatellite link bandwidth 67. The processor 112 may be further configured to update its estimates of the link topology 70 using the received values of the satellite-ground-station link bandwidth 66 and the intersatellite link bandwidth 67 in such examples.

Based at least in part on the satellite status data 60 and the link topology 70, the processor 112 is further configured to identify a first satellite constellation subset 80 and a second satellite constellation subset 82. The first satellite constellation subset 80 includes one or more selected satellite pairs 76 between which intersatellite data transfer is configured to be performed. Each of the selected satellite pairs 76 includes a sender satellite 10A and a recipient satellite 10B. In some examples, a satellite 10 may be included in multiple selected satellite pairs 76. Such a satellite 10 may be the sender satellite 10A in one or more of the selected satellite pairs 76 and the recipient satellite 10B in one or more other selected satellite pairs 76. In other examples, a satellite 10 may exclusively be a sender satellite 10A or a recipient satellite 10B in each of a plurality of selected satellite pairs 76.

The second satellite constellation subset 82 includes a plurality of locally computing satellites 10C that are configured to process their collected imaging data 40 locally rather than transmitting the imaging data 40 to another satellite 10 or receiving imaging data 40 from another satellite 10. Thus, the locally computing satellites 10C are the satellites 10 in the satellite constellation 26 that are not included in the selected satellite pairs 76.

In some examples, the processor 112 may be further configured to identify a third satellite constellation subset 86 including one or more idle satellites 10F. The one or more idle satellites 10F are satellites at which local training is not performed and at which intersatellite imaging data transfer is not performed. For example, the one or more idle satellites 10F may be satellites at which the available amount of energy 65 is insufficient to perform either local training or intersatellite data transfer.

Subsequently to identifying the first satellite constellation subset 80 and the second satellite constellation subset 82, the processor 112 may be further configured to transmit, to the satellites 10 included in the first satellite constellation subset 80, instructions 78 to perform intersatellite imaging data transfer. The instructions 78 to perform the intersatellite imaging data transfer include instructions to transfer a plurality of images 42 from the sender satellite 10A to the recipient satellite 10B. In addition, the processor 112 is further configured to transmit, to the locally computing satellites 10C includes in the second satellite constellation subset 82, instructions 84 to perform training at the local copies 50 of the machine learning model respectively stored at those locally computing satellites 10C.

Since the satellite constellation 26 frequently includes one or more satellites 10 that are out of communication range with the one or more ground stations 30, the instructions 78 to perform intersatellite imaging data transfer and/or the instructions 84 to perform training at the local copies 50 of the machine learning model may be transmitted to one or more satellites 10 indirectly via the intersatellite links 36, as discussed above with reference to FIG. 3A.

The techniques by which the processor 112 identifies the one or more selected satellite pairs 76 are discussed in further detail below. When identifying the one or more selected satellite pairs 76, the processor 112 is configured to compute respective link utility values 74 associated with a plurality of candidate pairs 88 of satellites 10 included in the satellite constellation 26. The candidate pairs 88 for which the processor 112 computes the link utility values 74 each include a candidate sender satellite 10D and a candidate recipient satellite 10E. The link utility values 74 are estimates of ML training performance increases that would be achieved by transferring imaging data between the satellites 10 included in the candidate pair 88.

Figure 5:
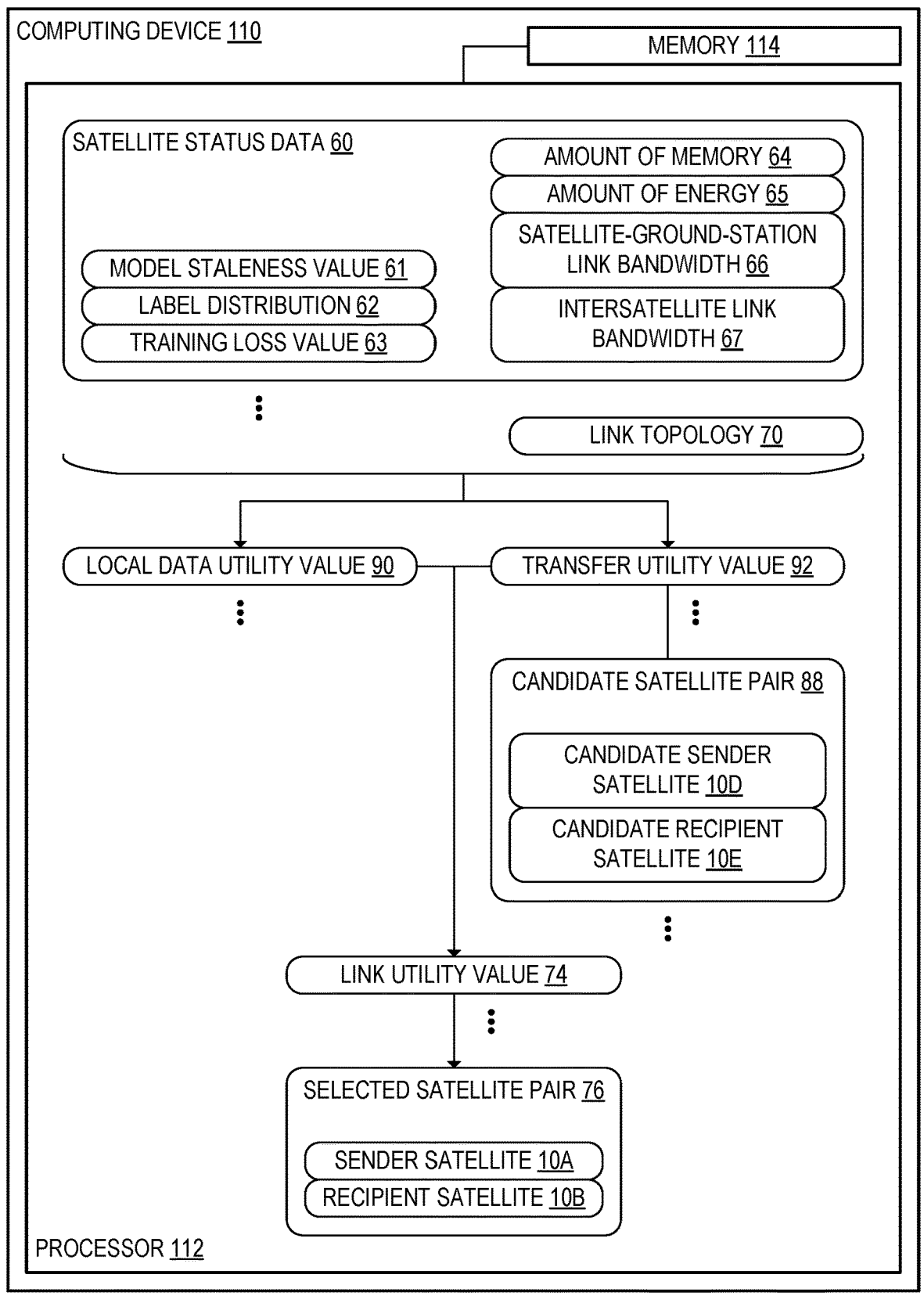
FIG. 5 schematically shows the computing device when the processor is configured to compute a plurality of link utility values, according to the example of FIG. 4.

FIG. 5 schematically shows the computing device 110 in additional detail when the processor 112 is configured to compute the link utility values 74, according to one example. As shown in the example of FIG. 5, the processor 112 is configured to compute a plurality of utility values including the link utility values 74, respective local data utility values 90 associated with the plurality of satellites 10, and respective transfer utility values 92 associated with the plurality of candidate pairs 88. The local data utility values 90 are estimates of the extent to which the labels 48 computed at a satellite 10 would increase the performance of the local copy 50 of the machine learning model if used as training data for local training, as discussed in further detail below. In addition, as discussed in further detail below, the transfer utility values 92 indicate the extent to which intersatellite transfer would make the label distribution 62 of the candidate recipient satellite 10E more representative of a total area over which imaging is performed.

When identifying the one or more selected satellite pairs 76, the processor 112 is further configured to compute the local data utility values 90 and the transfer utility values 92 based at least in part on the satellite status data 60 and the link topology 70. In addition, the processor 112 is further configured to compute the respective link utility value 74 associated with each of the candidate pairs 88 based at least in part on the transfer utility value 92 of the candidate pair 88 and the local data utility value 90 of a candidate recipient satellite 10E included in the candidate pair 88.

Figure 6:
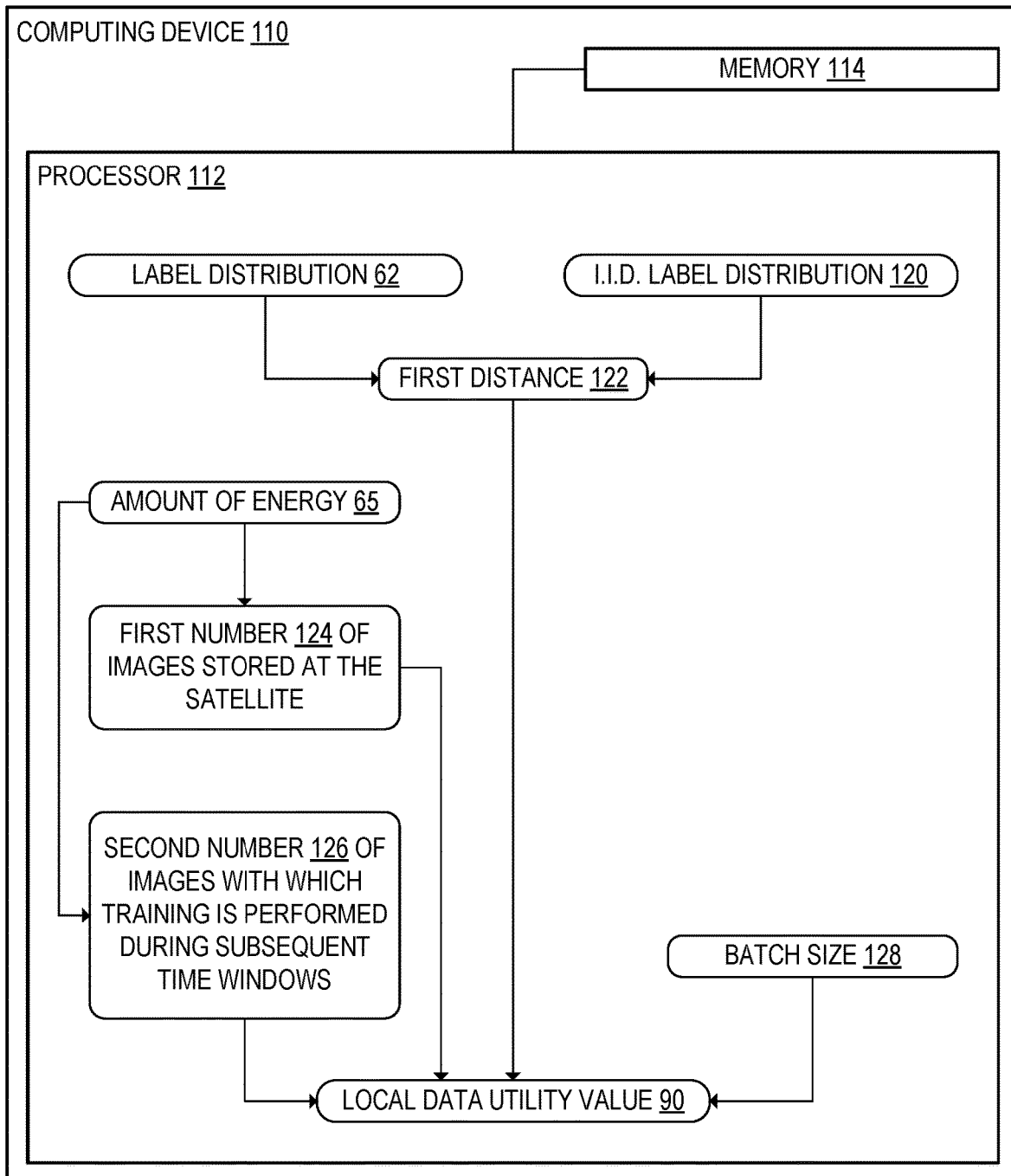
FIG. 6 schematically shows the computing device when the processor is configured to compute a local data utility value for a satellite, according to the example of FIG. 5.

FIG. 6 schematically shows the computing device 110 when the local data utility value 90 is computed for a satellite 10, according to one example. In the example of FIG. 6, the processor 112 is configured to compute the local data utility value 90 at least in part by computing a first distance 122 between the label distribution 62 and an independent identically distributed (i.i.d.) label distribution 120. The i.i.d. label distribution 120 is the distribution of labels 48 that would be computed at the satellite 10 if the images 42 collected at the satellite 10 were uncorrelated with each other and were uniformly sampled from the total area of the Earth imaged by the satellite constellation 26. The first distance 122 may be an L2 distance.

When computing the local data utility value 90, the processor 112 may be further configured to estimate a first number 124 of images 42 stored at the satellite 10. The first number 124 of images 42 is a number of captured data samples that are ready for use in training. In some examples, the first number 124 of images 42 may be indicated in the label distribution 62 received as part of the satellite status data 60. In addition, the processor 112 may be further configured to estimate a second number 126 of the images 42 with which training is configured to be performed at the local copy 50 of the machine learning model during one or more subsequent time windows 72. The processor 112 may be configured to compute the first number 124 and the second number 126 of images 42 based at least in part on the amount of energy 65 available at the satellite 10 during the time window 72.

The processor 112 may be further configured to compute the local data utility value 90 based at least in part on the first distance 122, the first number 124, the second number 126, and a batch size 128 used during training of the local copy 50 of the machine learning model. The local data utility value 90 for a satellite s may accordingly be computed as follows:

$$Util_d(s) = n_s^r (1 - F_{dis}(l_s))^{n_s^c / n_{batch}}$$

In the above equation, $n_s^r$ is the first number 124 of images 42, $n_s^c$ is the second number 126 of images 42, $l_s$ is the label distribution 62 of the labels 48 assigned to those images 42, $F_{dis}$ is a distance function, and $n_{batch}$ is the batch size 128.

Figure 7:
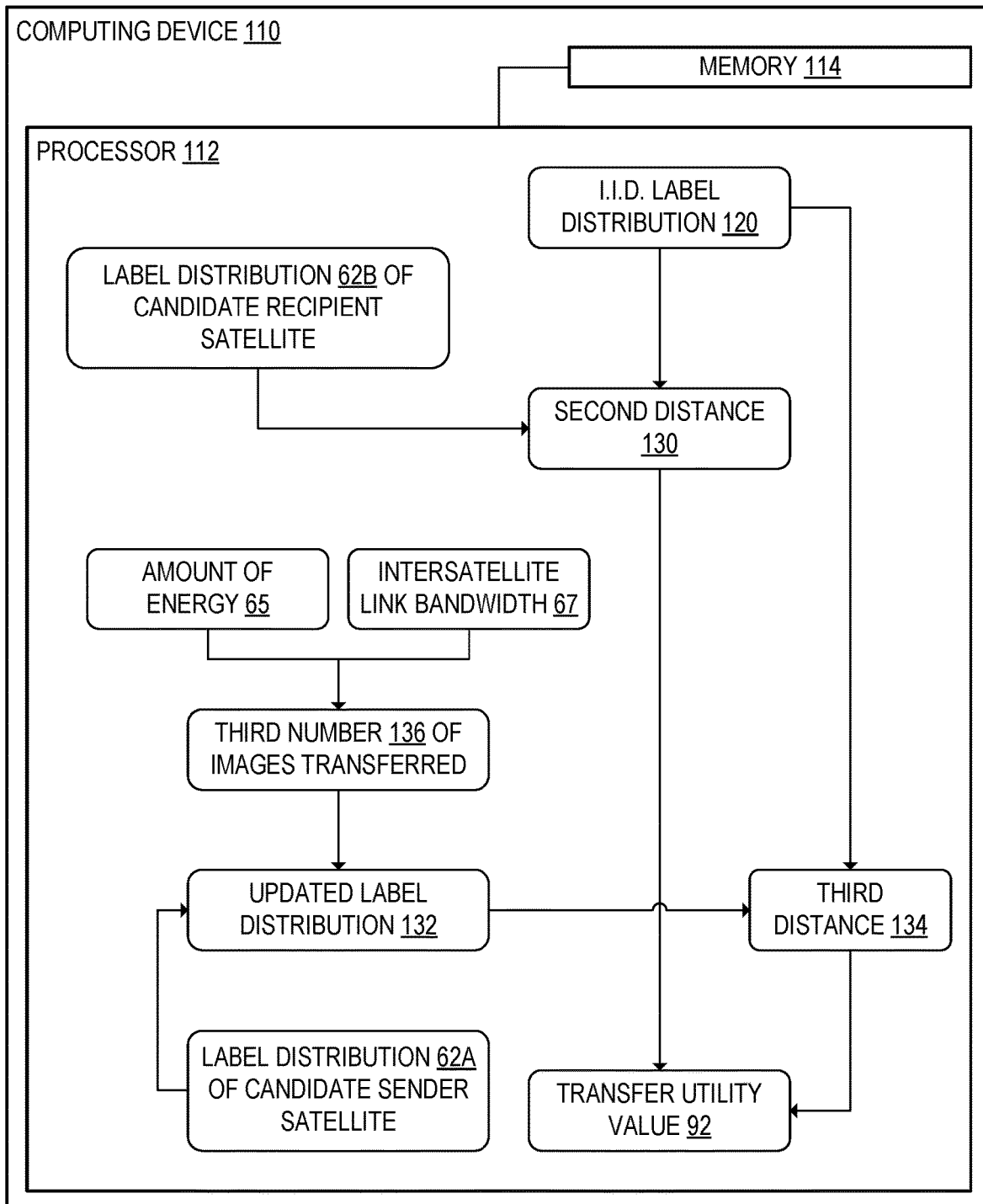
FIG. 7 schematically shows the computing device when the processor is configured to compute a transfer utility value for a candidate pair of satellites, according to the example of FIG. 5.

FIG. 7 schematically shows the computing device 110 when the transfer utility value 92 is computed for a candidate pair 88 of satellites 10, according to one example. For each of the plurality of candidate pairs 88, the processor 112 may be configured to compute the transfer utility value 92 at least in part by computing a second distance 130 associated with the candidate recipient satellite 10E included in the candidate pair 88. In such examples, the second distance 130 is the distance between a label distribution 62B of the candidate recipient satellite 10E and the i.i.d. label distribution 120.

Computing the transfer utility value 92 may further include computing an updated label distribution 132 based at least in part on a label distribution 62A of the candidate sender satellite 10D included in the candidate pair 88 and on a third number 136 of images 42 transferred from the candidate sender satellite 10D to the candidate recipient satellite 10E during the time window 72. The third number 136 may be computed based at least in part on the amounts of energy 65 available at the candidate sender satellite 10D and the candidate recipient satellite 10E, as well as the intersatellite link bandwidth 67 between the candidate sender satellite 10D and the candidate recipient satellite 10E. In addition, the processor 112 may be configured to compute a third distance 134 between the updated label distribution 132 of the candidate recipient satellite 10E and the i.i.d. label distribution 120. The processor 112 may be further configured to compute the transfer utility value 92 based at least in part on the second distance 130 and the third distance 134. The transfer utility value 92 for a candidate pair of satellites $s_x$ and $s_y$ may be computed as follows:

$$Util_t(s_x, s_y) = F_{dis}(l_y) - F_{dis}\left(n_{xy}^t \times \frac{l_x}{\|l_x\|} + l_y\right)$$

In the above equation, $l_y$ is the label distribution 62B of the candidate recipient satellite 10E, 1, is the label distribution 62A of the candidate sender satellite 10D, $n_{xy}^t$ is the third number 136 of images 42 transferred from the candidate sender satellite 10D to the candidate recipient satellite 10E, and $$n_{xy}^t \times \frac{l_x}{\|l_x\|} + l_y$$

is the updated label distribution 132.

Returning to the example of FIG. 4, the processor 112 may be further configured to compute the link utility values 74 for the candidate pairs 88 as follows:

$$Util_{link}(s_x, s_y) = \begin{cases} Util_t(s_x, s_y) \times Util_d^*(s_y) & \text{if } x \neq y \\ \xi \times Util_d(s_y) & \text{if } x = y \end{cases}$$

In the above equation, $Util_d^*(s_y)$ is the local data utility value 90 of the candidate recipient satellite 10E after transferred image data is received from the candidate sender satellite 10D. The processor 112 may be configured to compute $Util_d^*(s_y)$ using the equation for $Util_d(s)$ discussed above, but with values of $n_s^r$, $n_s^c$, and $l_s$ updated to account for the image transfer. The updated label distribution 132 may be computed as $$n_{xy}^t \times \frac{l_x}{\|l_x\|} + l_y,$$

as discussed above. In addition, $\xi$ is a default self-computation value.

Figure 8:
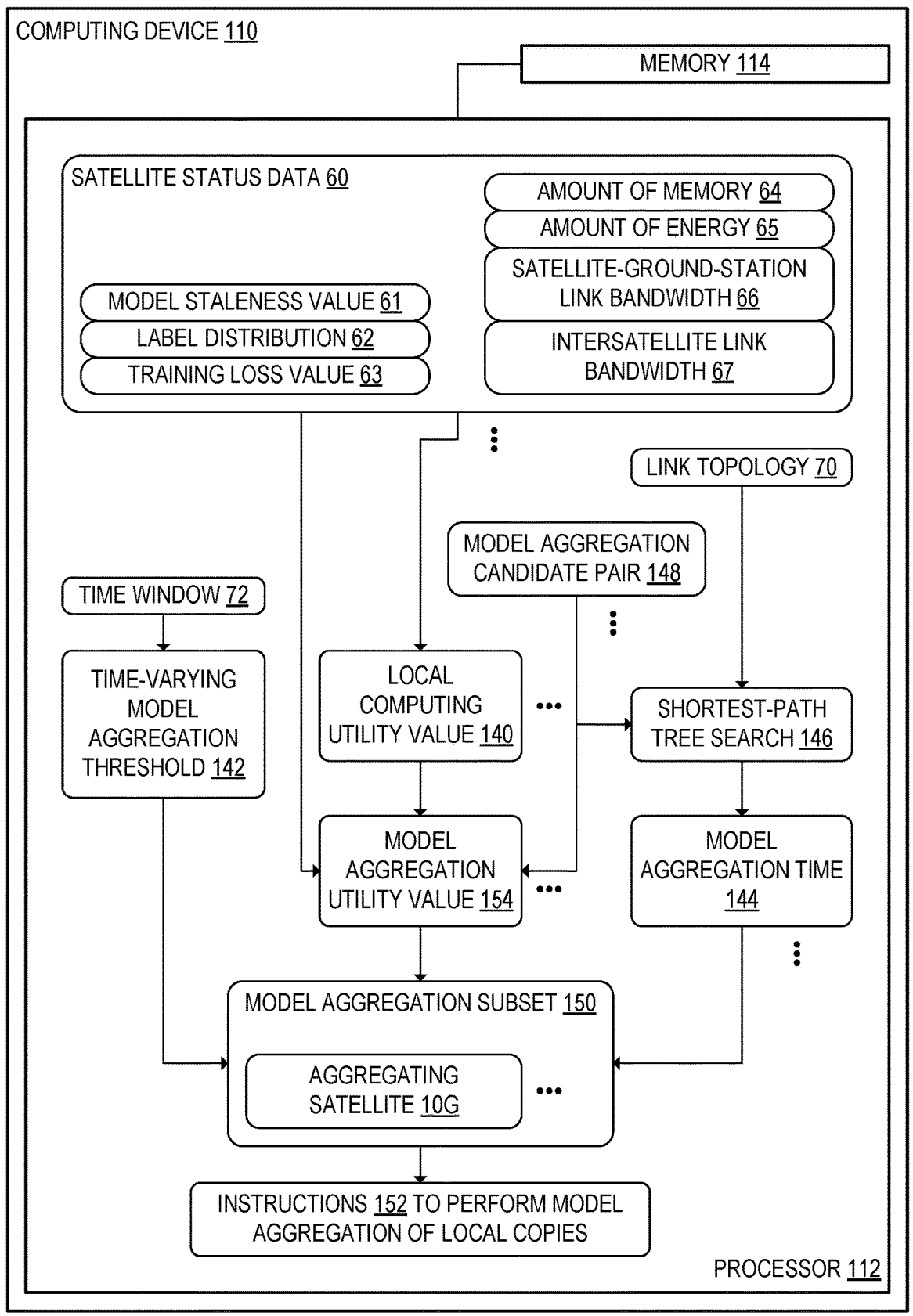
FIG. 8 schematically shows the computing device when the processor is configured to identify a model aggregation subset of the satellite constellation, according to the example of FIG. 1.

In addition to identifying a plurality of satellites 10 among which to share imaging data 40, the processor 112 may be further configured to identify a plurality of satellites 10 among which to perform model aggregation. FIG. 8 schematically shows the computing device 110 when the processor 112 is configured to identify a model aggregation subset 150 of the satellite constellation 26. The model aggregation subset 150 includes a plurality of aggregating satellites 10G that are configured to aggregate their local copies 50 of the ML model. When determining the model aggregation subset 150, the processor 112 may be configured to determine whether to perform model aggregation for each of a plurality of model aggregation candidate pairs 148 of satellites 10 included in the satellite constellation 26.

In some examples, when identifying the model aggregation subset 150, the processor 112 may be configured to compute respective local computing utility values 140 associated with the plurality of satellites 10 based at least in part on the satellite status data 60. The local computing utility value 140 computed for a satellite 10 indicates an estimated effectiveness of performing local training at the local copy 50 of the machine learning model stored at the satellite 10.

The processor 112 may be configured to compute the local computing utility values 140 as follows:

$$Util_c = n_s^c \sqrt{\frac{(\eta_s + 1)^{-a}}{\|\mathcal{D}_s^p\|} \sum_{d \in \mathcal{D}_s^p} \text{Loss}(d)^2}$$

In the above equation, $n_s^c$ is the second number 126 of images 42 with which training is configured to be performed at the local copy 50 of the ML model in one or more subsequent time windows 72, as discussed above. $\eta_s$ is the model staleness value 61, a is a first positive decay factor, $\|\mathcal{D}_s^p\|$ is the number of data samples with which the local copy 50 is trained during the time window 72, and Loss (d) is the training loss value 63. The first positive decay factor a is used to account for the decrease in classification accuracy of the ML model when stale training data is used to perform model updates. The processor 112 may be configured to compute $\|\mathcal{D}_s^p\|$ based at least in part on the amount of energy 65 available at the satellite 10.

The processor 112 may be further configured to identify the model aggregation subset 150 based at least in part on the local computing utility values 140. When the processor 112 uses the local computing utility values 140 to identify the model aggregation subset 150, the processor 112 may be further configured to compute a plurality of model aggregation utility values 154 based at least in part on the local computing utility values 140 and the satellite status data 60. The model aggregation utility values 154 may be respectively associated with the model aggregation candidate pairs 148. The processor 112 may be configured to compute the model aggregation utility values 154 from the local computing utility values 140 as follows:

$$Util_a(S, \varepsilon) = \left(\frac{\sum_{s \in S} \eta_s}{\|S\|} + 1\right)^a \sum_{s \in S} \varepsilon_s \times Util_c(s)$$

In the above equation, $|S|$ is the total number of satellites 10 in the satellite constellation 26 and $\varepsilon_s$ is a process efficiency. The process efficiency $\varepsilon_s$ is a fraction of the imaging data 40 with which training is performed in examples in which model aggregation is also performed. Thus, the process efficiency $\varepsilon_s$ is used to account for time and energy consumption associated with model aggregation.

The processor 112 may be further configured to utilize a time-varying model aggregation threshold 142 when determining the model aggregation subset 150. The time-varying model aggregation threshold 142 may be computed as $\theta_0(t+1)^{-b}$, where $\theta_0$ is an initial aggregation threshold and b is a second positive decay factor. The processor 112 may be configured to determine whether the model aggregation candidate pairs 148 satisfy the following criterion:

$$\frac{Util_a(S_{cx}, \varepsilon)}{Util_a(S_{cc}, 1)} > \theta_0(t+1)^{-b}$$

where $S_{cx}$ is the out-of-range subset of the satellite constellation 26, $S_{cc}$ is the in-range subset, and $\iota$ is the process efficiency.

In examples in which the processor 112 is configured to identify a third satellite constellation subset 86 including one or more idle satellites 10F, the model aggregation utility values 154 may be computed for each of the satellites 10 not included in the third satellite constellation subset 86. Thus, in such examples, the one or more idle satellites 10F may be excluded from the link topology 70 when determining the model aggregation utility values 154.

For each of the model aggregation candidate pairs 148 of satellites 10 included in the satellite constellation 26, the processor 112 may be further configured to compute a model aggregation time 144 of the respective local copies 50 of the machine learning model stored at those satellites 10. The model aggregation time 144 is an estimated amount of time that would elapse during aggregation of the local copies 50 of the aggregating satellites 10G, including time spent on intersatellite communication and time spent on training. In some examples, the processor 112 may be configured to compute the model aggregation time 144 least in part by performing a shortest-path tree search 146 over the link topology 70. Similarly to during the computation of the model aggregation utility values 154, one or more idle satellites 10F included in the third satellite constellation subset 86 may be excluded from the link topology 70 in some examples when performing the shortest-path tree search 146.

The processor 112 may be further configured to determine whether the model aggregation time 144 is shorter in duration than the time window 72, such that $T_{MA} < T_t$. A model aggregation time 144 shorter than the time window 72 indicates that model aggregation between the satellites 10 included in the model aggregation candidate pair 148 is feasible to perform within the time window 72 given the current link topology 70 of the satellite constellation 26 and the one or more ground stations 30. Accordingly, the processor 112 may be further configured to identify the model aggregation subset 150 based at least in part on the determinations of whether the model aggregation time 144 is shorter in duration than the time window 72.

As shown in the example of FIG. 8, the processor 112 may be configured to use the local computing utility values 140 and the time-varying model aggregation threshold 142 as well as the model aggregation times 144 of the model aggregation candidate pairs 148 when computing the model aggregation subset 150. In such examples, the processor 112 may be configured to include a model aggregation candidate pair 148 of satellites 10 in the model aggregation subset 150 when the satellites 10 fulfill the criteria discussed above for both the time-varying model aggregation threshold 142 and the model aggregation utility values 154.

Figure 9:
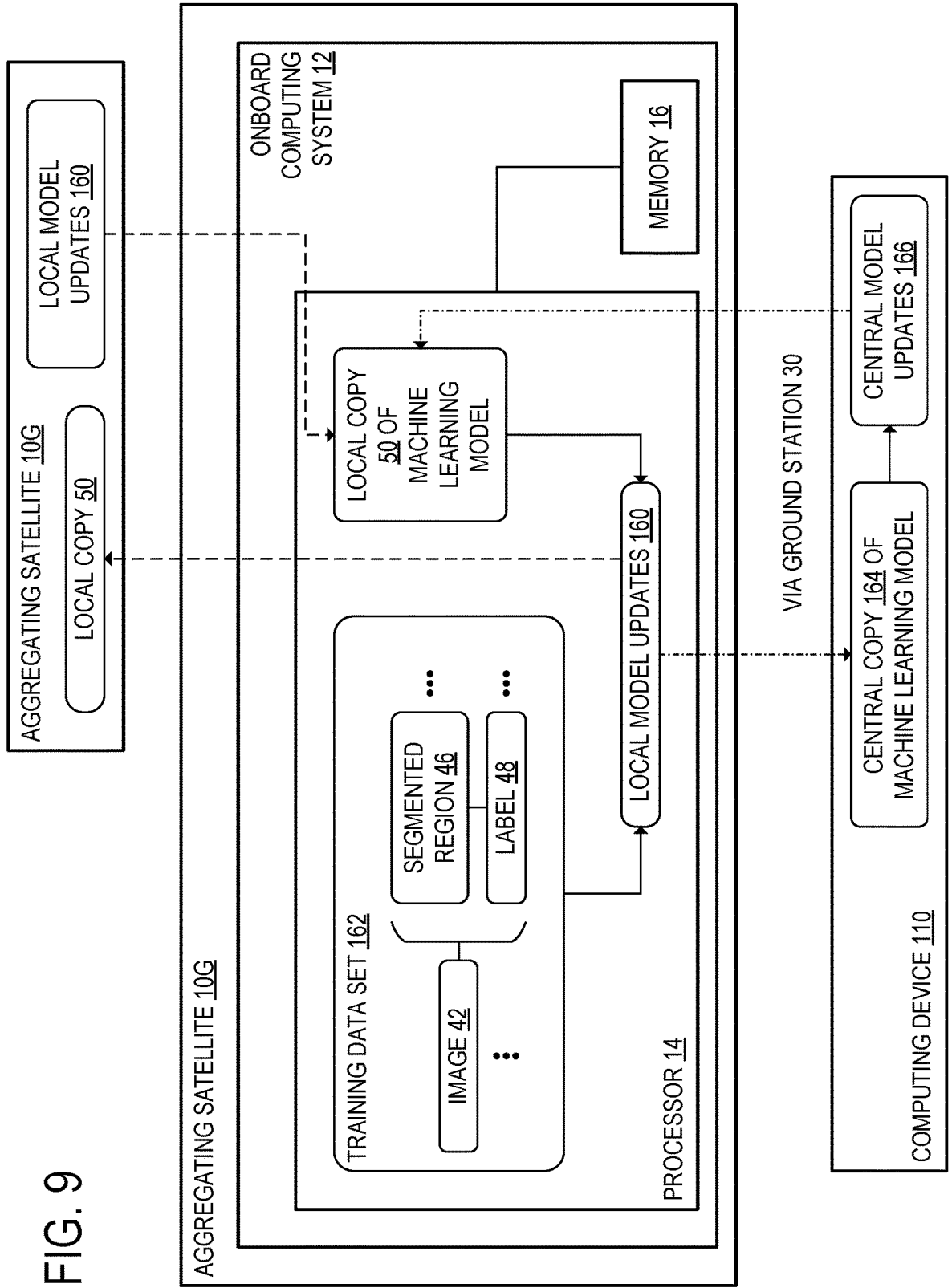
FIG. 9 schematically shows a pair of aggregating satellites and the computing device when model aggregation is performed, according to the example of FIG. 8.

Subsequently to identifying the model aggregation subset 150, the processor 112 may be further configured to transmit, to the aggregating satellites 10G included in the model aggregation subset 150, instructions 152 to aggregate their respective local copies 50 of the machine learning model. FIG. 9 schematically shows a pair of aggregating satellites 10G and the computing device 110 when model aggregation is performed. The aggregating satellite 10G is configured to compute a set of local model updates 160 to the weights of its local copy 50 of the ML model when the local copy 50 is trained using a training data set 162. The training data set 162, in the example of FIG. 9, includes the plurality of images 42 included in the imaging data 40, as well as the segmented regions 46 and labels 48 computed for those images 42.

As shown in the example of FIG. 9, the aggregating satellites 10G may be configured to transmit local model updates 160 over the intersatellite links 36 when performing the model aggregation. Pairs of aggregating satellites 10G may be configured to transmit their respective local model updates 160 to each other in response to receiving the instructions 152 to perform model aggregation. The aggregating satellites 10G may communicate indirectly with each other over the intersatellite links 36 in examples in which the aggregating satellites 10G are out of range to communicate directly with each other.

One or more of the aggregating satellites 10G may be further configured to perform model aggregation between their local copies 50 of the ML model and a central copy 164 of the ML model stored at the computing device 110. The one or more aggregating satellites 10G may, in such examples, be further configured to transmit their local model updates 160 to the computing device 110 via the ground station 30, where the local model updates 160 may be used to further train the central copy 164 of the ML model. At the computing device 110, the processor 112 may be further configured to compute central model updates 166 to the weights of the central copy 164 based at least in part on the local model updates 160 received from the one or more aggregating satellites 10G. The processor 112 may be further configured to transmit the central model updates 166 to the one or more aggregating satellites 10G. Accordingly, the computing device 110 may be further configured to increase the accuracy of the local copies 50 of the machine learning model by updating for additional training performed at the other satellites 10 and the computing device 110.

The intersatellite communication scheduling process performed for the satellite constellation 26 at the computing device 110 may be summarized by the following pseudocode:

---

Input: Time Steps $\mathcal{T}$, Sat constellation $\mathcal{S}$, GS set $\mathcal{G}$
Output: Decision-making strategy for $\forall s \in \mathcal{S}$ at each time window $T_t$ for $t \in \mathcal{T}$
Loop $t \in \mathcal{T}$ with a scheduling window $T_t$
    /* Step-1: Retrieve and update sat profiling */
    Loss, H, E, M, l, G = UpdateProfiling($\mathcal{S}$, $\mathcal{G}$, t)
    $Util_c$ ($\mathcal{S}$) = UpdateCompUtil(Loss, H, E, M)
    $\mathcal{S}_c$, $\mathcal{S}_{cc}$ = SatStatusDetection($\mathcal{S}$, E)
    /* Step-2: Inter-sat MA feasibility check */
    $T_{MA}$, $\mathcal{S}_c$, $\varepsilon$ = ShortestPath Tree($\mathcal{S}_c$, $G_{ISL}$, $p_t$)

$$\text{If } T_{MA} < T_t \text{ and } \frac{Util_a(\mathcal{S}_c - \mathcal{S}_{cc}, \varepsilon)}{Util_a(\mathcal{S}_{cc}, 1)} > \theta_0 (t+1)^{-b}:$$

UpdateCompEfficiency($\mathcal{S}_c$, $\varepsilon$)
    /* Step-3: Execute local training and MA */
    $\mathcal{P}$ = Execute Training($\mathcal{S}_c$, $\varnothing$)

-continued

```
Else:
    Util_link = InitLinkUtil(S_c, E, M, l)
    S_t = Ø
    While ∃Util_link (s_x, s_y) > 0:
        s_x, s_y = argmax_{s_x,s_y} Util_link (s_x, s_y)
        If x ≠ y: S_t.add(s_x)
            Util_link = UpdateUtilLink(S_c, E, M, l, s_x, s_y)
    /* Step-4: Execute DT and local training */
    P = ExecuteTraining(S_c - S_t, S_t)
/* Step-5: Comm model and data with the ground */
CommWithGround(P, S, E)
```

In the above pseudocode, Loss is the set of training loss values 63, H is the set of model staleness values 61, E is the set of available amounts of energy 65, M is the set of available amounts of memory 64, l is the set of label distributions 62, G is the link topology 70. $S_c$ is the set of satellites 10 with sufficient energy to perform local computation or data transfer, which may be the satellites not included in the third satellite constellation subset 86. $G_{ISL}$ is the subgraph of the link topology 70 formed by the intersatellite links 36. $p_t$ is the set of model parameters of the local copy 50, $\mathcal{P}$ is the set of local model updates 160. $S_t$ is the first satellite constellation subset 80, which is iteratively constructed when the steps of the pseudocode shown above are performed.

Figure 10A:
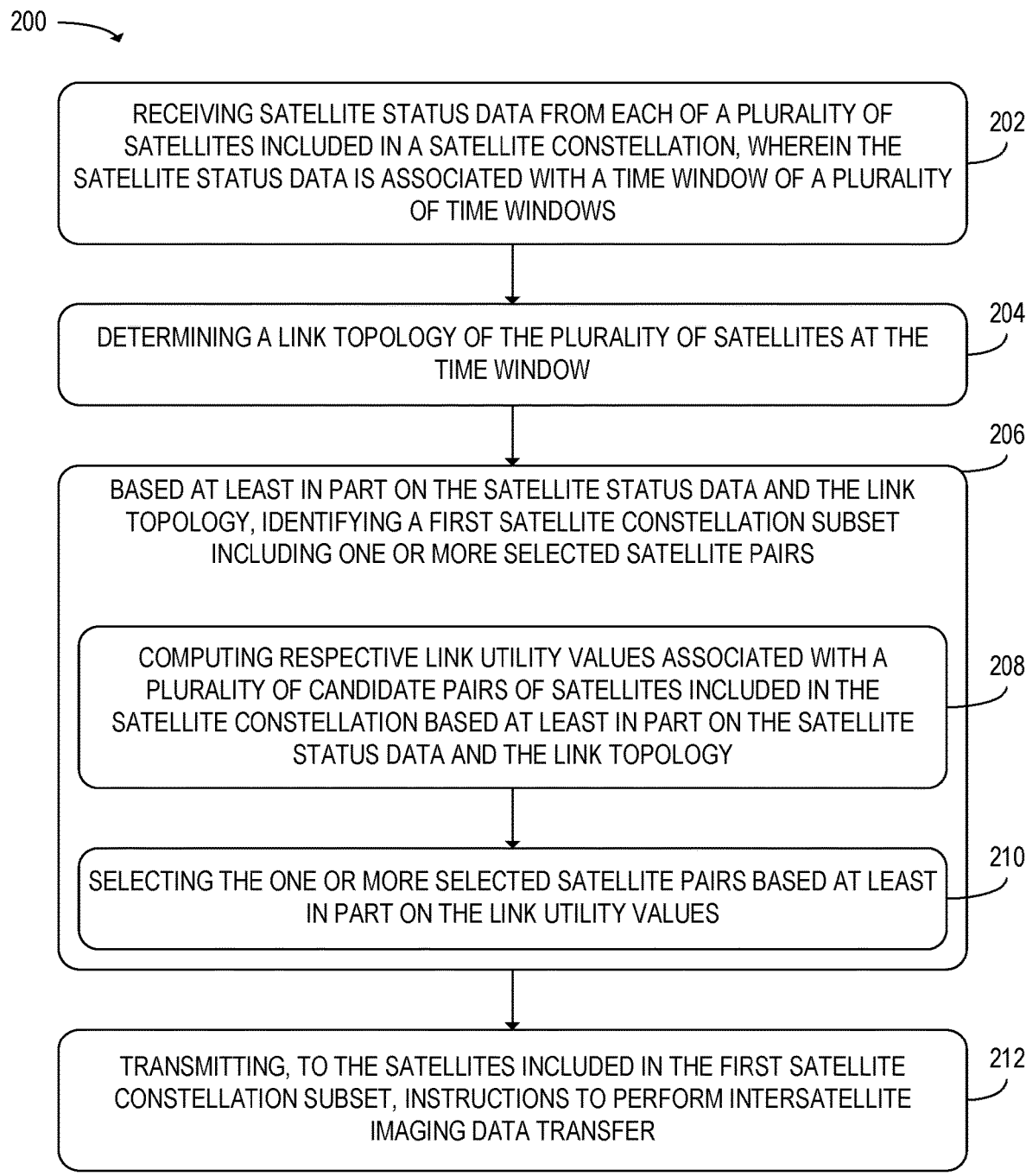
FIG. 10A shows a flowchart of a method for use with a computing device that is configured to communicate with a satellite constellation, according to the example of FIG. 1.

FIG. 10A shows a flowchart of a method 200 for use with a computing device that is configured to communicate with a satellite constellation. The computing device may be a ground-based computing device located at a ground station or communicatively coupled to the ground station. At step 202, the method 200 includes receiving satellite status data from each of a plurality of satellites included in a satellite constellation. The satellite status data is associated with a time window of a plurality of time windows. For example, the computing device may receive the satellite status data at an interval of five minutes.

In some examples, for each of the plurality of satellites, the satellite status data associated with that satellite may include a model staleness value of a local copy of a machine learning model during the time window. The local copy of the machine learning model is the copy stored at the satellite of a machine learning model that is trained in a distributed manner across the satellite constellation. In addition, the satellite status data associated with the satellite may further include a training loss value of the local copy of the machine learning model. For one or more satellites at which training was performed during the time window, the training loss value included in the satellite status data may be the training loss value computed during that time window. For one or more other satellites at which training was not performed during the time window (e.g., because the one or more other satellites offloaded their imaging data or had insufficient energy), the training loss value may be a most recent training loss value computed prior to the time window.

For each of the plurality of satellites, the satellite status data associated with that satellite may further include a label distribution of a plurality of labels computed at the local copy of the machine learning model during the time window. In some examples, the machine learning model may be further configured to perform image segmentation on the imaging data collected at the satellites. In such examples, the labels may be assigned to segments of images that are identified during image segmentation.

Additional quantities that indicate resource availability at the satellites may also be included in the satellite status data. For example, the satellite status data associated with the satellite may further include a satellite-ground-station link bandwidth, an intersatellite link bandwidth, an amount of memory available at the satellite during the time window, and/or an amount of energy available at the satellite during the time window.

At step 204, the method 200 further includes determining a link topology of the plurality of satellites at the time window. The link topology may be a graph indicating which satellites included in the satellite constellation, as well as one or more ground stations, are within communication range of each other. The vertices of the graph may be the satellites and the one or more ground stations, and the edges may be intersatellite links and satellite-ground-station links.

At step 206, the method 200 further includes identifying a first satellite constellation subset including one or more selected satellite pairs, wherein identifying the one or more selected satellite pairs based at least in part on the satellite status data and the link topology. The one or more selected satellite pairs are satellites between which intersatellite data transfer is performed, as discussed below. The computing device may also identify a second satellite constellation subset including satellites that are not included in the selected pairs and are instead configured to process their collected image data locally. In addition, the computing device may identify a third satellite constellation subset that includes one or more idle satellites.

Step 206 includes, at step 208, computing respective link utility values associated with a plurality of candidate pairs of satellites included in the satellite constellation. The link utility values are computed based at least in part on the satellite status data and the link topology. The link utility values indicate whether transferring imaging data between the satellites included in the candidate pair would lead to increased performance when training the local copies of the machine learning model stored at those satellites. At step 210, step 206 further includes selecting the one or more selected satellite pairs based at least in part on the link utility values. Thus, by identifying pairs of satellites that have high link utility values, the computing device may identify opportunities to increase model performance and training efficiency by transferring training data between satellites.

At step 212, the method 200 further includes transmitting, to the satellites included in the first satellite constellation subset, instructions to perform intersatellite imaging data transfer. The computing device may also transmit, to the satellites included in the second satellite constellation subset, instructions to perform training at the local copies of the machine learning model stored at those satellites. The instructions may be transmitted to the satellites directly from the one or more ground stations or via paths that pass through one or more other satellites.

Figure 10B:
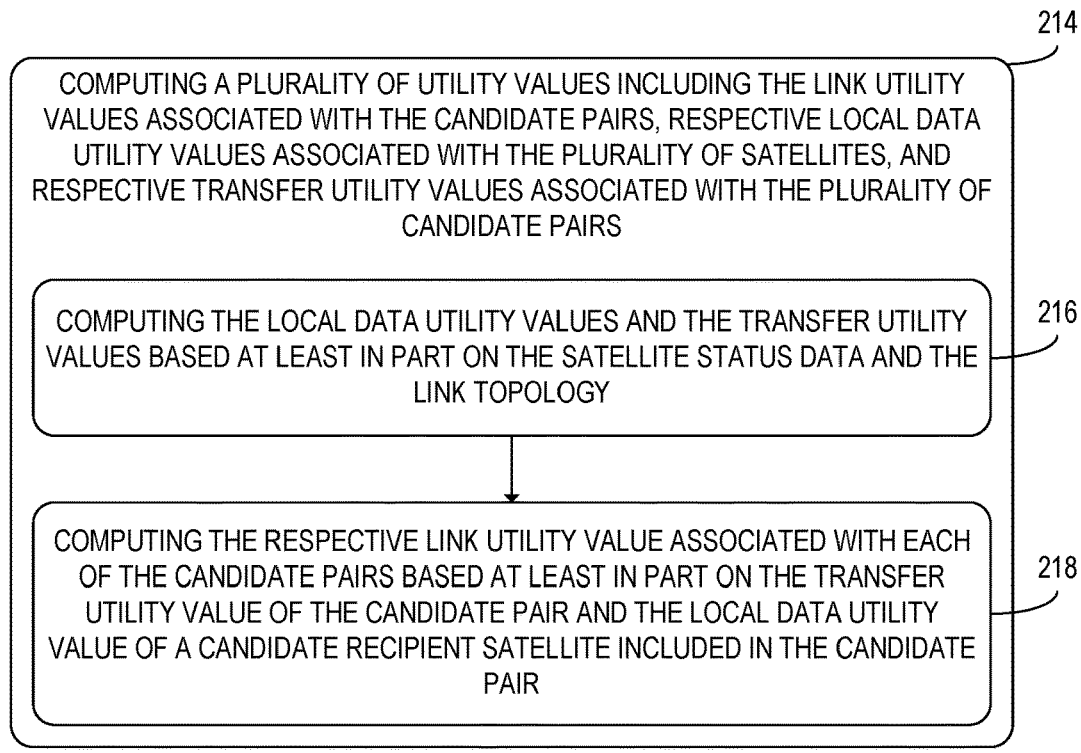
FIG. 10B shows additional steps of the method of FIG. 10A that may be performed when identifying a first satellite constellation subset.

FIG. 10B shows additional steps of the method 200 that may be performed when identifying the first satellite constellation subset at step 206. At step 214, the method 200 may further include computing a plurality of utility values including the link utility values associated with the candidate pairs. The plurality of utility values further includes respective local data utility values associated with the plurality of satellites and respective transfer utility values associated with the plurality of candidate pairs. The local data utility values may be estimates of the extent to which the labels stored at the satellites would increase the performance of the local copies of the machine learning model if used as training data, adjusted for the representativeness of the label distributions of the satellites. The transfer utility values may be estimates of the extent to which intersatellite transfer of training data would make the label distributions of the recipient satellites more representative of a total area imaged by the satellite constellation.

At step 216, step 214 may further include computing the local data utility values and the transfer utility values based at least in part on the satellite status data and the link topology. At step 218, step 214 may further include computing the respective link utility value associated with each of the candidate pairs based at least in part on the transfer utility value of the candidate pair and the local data utility value of a candidate recipient satellite included in the candidate pair. For example, the link utility value of a candidate pair may be computed as the product of the transfer utility value computed for the candidate pair and the local data utility value computed for the recipient satellite.

Figure 10C:
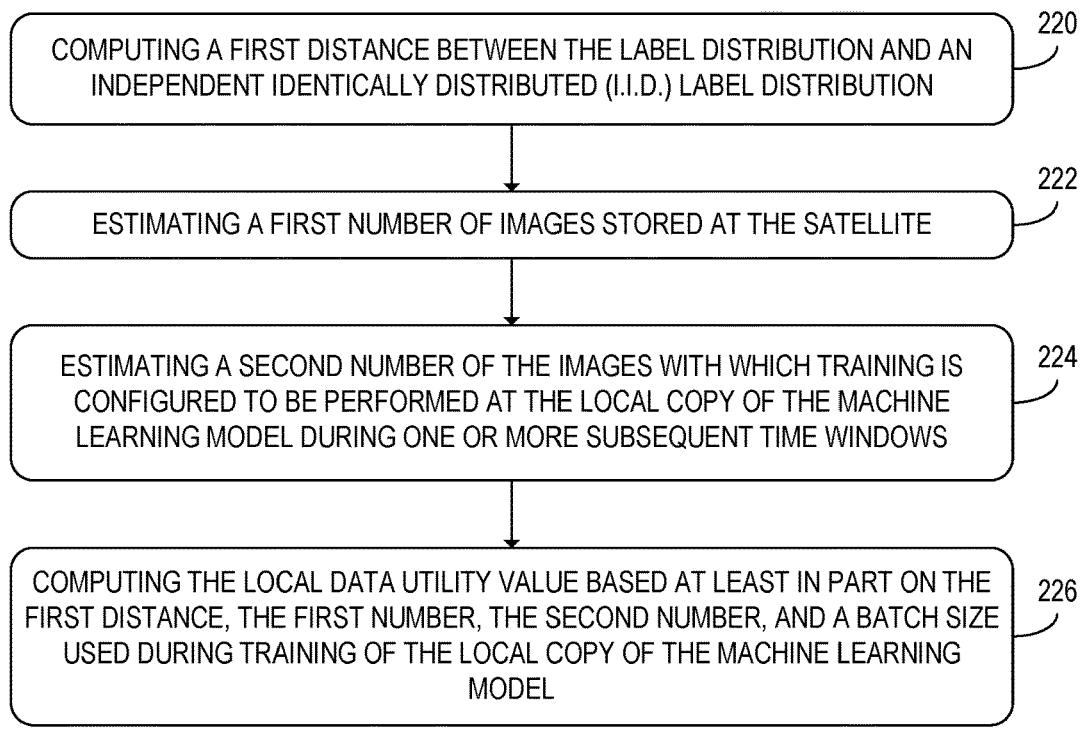
FIG. 10C shows additional steps of the method that may be performed when computing a local data utility value associated with a satellite, according to the example of FIG. 10B.

FIG. 10C shows additional steps of the method 200 that may be performed during step 216 in some examples when computing the local data utility value associated with a satellite. The steps of FIG. 10C are performed in examples in which the satellite status data includes label distributions associated with the satellites. At step 220, the method 200 may further include computing a first distance between the label distribution and an independent identically distributed (i.i.d.) label distribution. For example, the first distance may be an L2 distance. The i.i.d. label distribution is the label distribution that would be obtained by randomly selecting uncorrelated labels from among all the labels computed at the satellites' local copies of the machine learning model. The computing device may estimate the i.i.d. label distribution when performing step 220.

At step 222, the method 200 may further include estimating a first number of images stored at the satellite. In addition, at step 224, the method 200 may further include estimating a second number of the images with which training is performed at the local copy of the machine learning model during one or more subsequent time windows. At step 226, the method 200 may further include computing the local data utility value based at least in part on the first distance, the first number, the second number, and a batch size used during training of the local copy of the machine learning model.

Figure 10D:
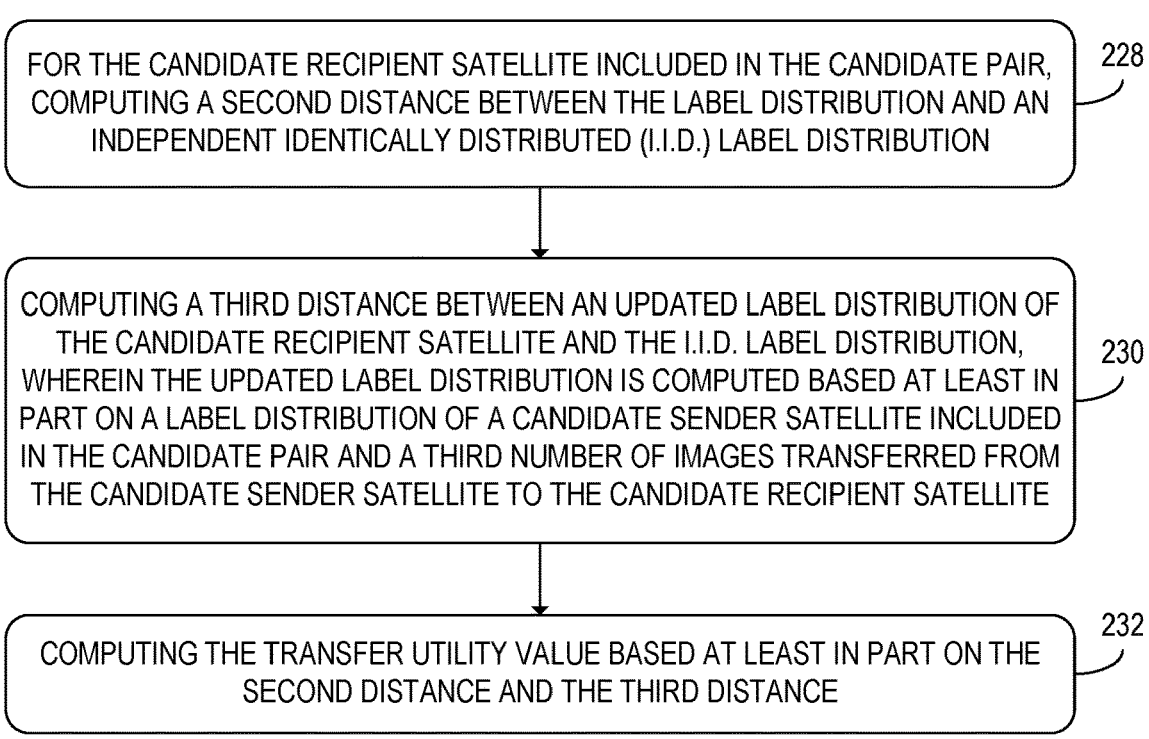
FIG. 10D shows additional steps of the method that may be performed when computing a transfer utility value associated with a candidate pair of satellites, according to the example of FIG. 10B.

FIG. 10D shows additional steps of the method 200 that may be performed during step 216 in some examples when computing the transfer utility value associated with a candidate pair of satellites. At step 228, for the candidate recipient satellite included in the candidate pair, the method 200 further includes computing a second distance between the label distribution and the i.i.d. label distribution. In addition, the method 200 further includes, at step 230, computing a third distance between an updated label distribution of the candidate recipient satellite and the i.i.d. label distribution. The updated label distribution is computed based at least in part on a label distribution of a candidate sender satellite included in the candidate pair, as well as a third number of images transferred from the candidate sender satellite to the candidate recipient satellite. The second distance and the third distance may be L2 distances, as in the case of the first distance. At step 232, the method 200 may further include computing the transfer utility value based at least in part on the second distance and the third distance.

Figure 10E:
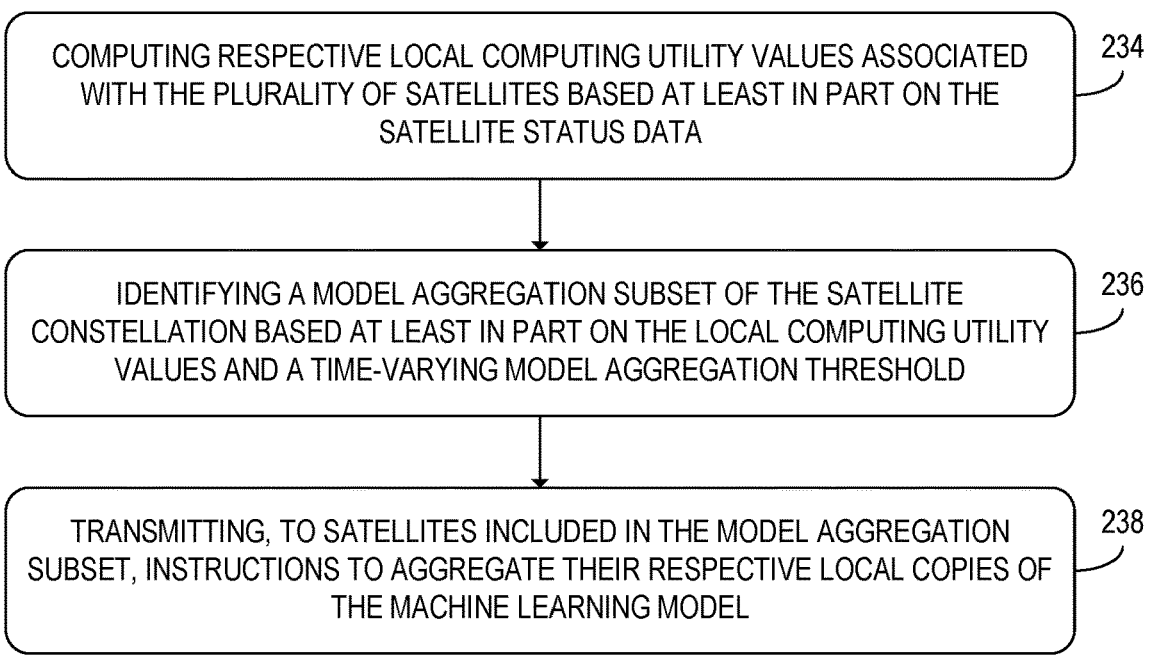
FIG. 10E shows additional steps of the method of FIG. 10A that may be performed in examples in which the satellites perform model aggregation.

In addition to determining whether to perform imaging data transfer between pairs of satellites, the method 200 may further include determining whether to perform model aggregation between the local copies of the machine learning model stored at the satellites. FIG. 10E shows additional steps of the method 200 that may be performed in examples in which the satellites perform model aggregation. At step 234, the method 200 may further include computing respective local computing utility values associated with the plurality of satellites based at least in part on the satellite status data. The local computing utility value for a satellite may be an estimate of an extent to which local training increases the performance of the local copy of the ML model stored at the satellite, adjusted to account for model staleness and training loss.

At step 236, the method 200 may further include identifying a model aggregation subset of the satellite constellation based at least in part on the local computing utility values and a time-varying model aggregation threshold. The model aggregation subset includes a plurality of aggregating satellites that are configured to perform model aggregation. The time-varying model aggregation threshold may decrease over time according to a decay factor in order to account for model staleness. In addition, identifying the model aggregation subset may include computing a plurality of model aggregation utility values associated with the satellites. The model aggregation subset may be identified based at least in part on the model aggregation utility values.

At step 238, the method 200 may further include transmitting, to satellites included in the model aggregation subset, instructions to aggregate their respective local copies of the machine learning model. The local copies may be aggregated by transmitting sets of local model updates between the satellites included in the model aggregation subset over intersatellite links. The local copies may also be aggregated with a central copy of the ML model stored at the ground-based computing device. In such examples, the computing device may receive local model update data from the plurality of satellites and update the central copy of the machine learning model based at least in part on the local model update data.

Figure 10F:
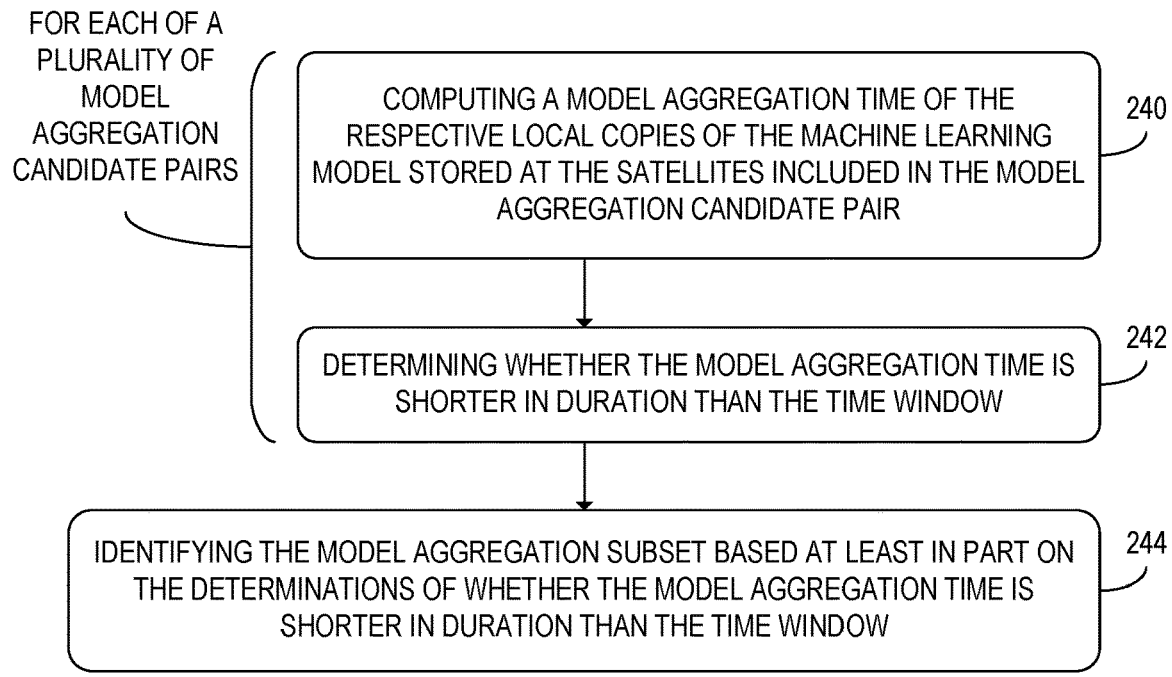
FIG. 10F shows additional steps of the method that may be performed in examples in which the steps of FIG. 10E are performed.

FIG. 10F shows additional steps of the method 200 that may be performed in examples in which the steps of FIG. 10E are performed. At step 240, the method 200 may further include, for each of a plurality of model aggregation candidate pairs, computing a model aggregation time of the respective local copies of the machine learning model stored at the satellites included in the model aggregation candidate pair. The model aggregation time may be an estimate of the amount of time that would elapse when performing model aggregation between the local copies stored at the satellites in the pair. The model aggregation time may be computed based at least in part on the link topology.

At step 242, the method 200 may further include, for each of the plurality of candidate pairs, determining whether the model aggregation time is shorter in duration than the time window. At step 244, the method 200 may further include identifying the model aggregation subset based at least in part on the determinations of whether the model aggregation time is shorter in duration than the time window. Thus, model aggregation may be performed for model aggregation candidate pairs that are capable of aggregating their local copies within the time window.

Experimental results obtained in simulations of the above intersatellite communication scheduling techniques (referred to as ARISE) are discussed below. In the simulations discussed below, the orbital parameters of each satellite were represented in the link topology using a respective two line element (TLE) set. Simulations were performed for a 207-satellite constellation and a 117-satellite constellation. 12 ground station locations were used in the simulations. ML model performance was tested for three tasks:

1. Functional Map of the World (fMoW): land function prediction across 62 categories, with 360,000 RGB images used as training data collected from 363 universal transverse Mercator (UTM) zones.

equal to 360 GB. The images stored at each of the satellites had the size 200 MB in fMoW, 300 MB in ETCI2021, and 400 MB in So2Sat. The satellites were each simulated as deleting 50% of the oldest data samples by collection time whenever the total size of the images stored at the satellite reached 90% of the total memory capacity. The ML models trained for the fMoW, So2Sat, and ETCI2021 tasks respectively had minibatch sizes of 24, 64, and 96, and respectively had learning rates of 5e-3, 1e-3, and 1e-3. In ARISE, the first positive decay factor a was set to 1, the amount of energy & used in model aggregation was set to 0.9, the second positive decay factor b was set to 0.5, and the default self-computation value $\xi$ was set to 20.

The final test accuracy of the different scheduling approaches is summarized in the following table. The following table also shows the ML model architectures used in each of the ML tasks.

| Space task | Dataset & model | Const. | BP | SFL | AFL | FedB | FedS | ARISE |
|---|---|---|---|---|---|---|---|---|
| Land function recog. | fMoW & DenseNet | 207-sat | 18.0% | 14.1% | 31.2% | 32.2% | 23.2% | 46.8% |
| | | 117-sat | 15.2% | 10.3% | 36.8% | 21.8% | 23.2% | 49.7% |
| Zone recog. | So2Sat & ResNet | 207-sat | 33.3% | 10.5% | 17.8% | 14.8% | 10.5% | 47.0% |
| | | 117-sat | 39.1% | 9.4% | 35.1% | 20.5% | 19.1% | 45.1% |
| Flood detection | ETCI2021 & U-Net | 207-sat | 46.0% | 46.3% | 16.5% | 48.1% | 43.2% | 48.1% |
| | | 117-sat | 48.8% | 46.1% | 11.3% | 46.4% | 46.9% | 47.5% |

2. So2Sat: 17-category climate zone classification across 43 cities using 400,000 multi-spectral images as training data.
3. ETCI2021: detection of flooded areas by segmenting synthetic aperture radar (SAR) data.

The ARISE techniques discussed above were compared to baseline techniques including the centralized training approach BentPipe (BP) and four federated learning approaches: AsyncFL (AFL), SyncFL (SFL), FedBuff (FedB), and FedSpace (FedS). The main performance metric used in the simulations was time-to-accuracy, which is expressed as the final test accuracy of the central ML model and its training wall clock time. The final test accuracy is averaged over the last five time windows.

The following parameters were used for the satellites in the simulations. The duration of each time window was set to 5 minutes. The total memory capacity of each satellite was As shown in the above table, ARISE has the highest final test accuracy on each of the tested tasks, except flood detection at the 117-satellite constellation. These improvements are particularly large for the land function recognition task.

The following table shows the amounts of wall-clock training time in which ARISE achieves the same final test accuracy as the baseline techniques. Corresponding speedups are shown in parentheses in the following table.

| Setup | BP | AFL | FedS |
|---|---|---|---|
| fMoW 207-sat | 4.7 h (5.0×) | 11.8 h (2.0×) | 7.3 h (3.2×) |
| fMoW 117-sat | 2.41 h (10.5×) | 11.8 h (2.1×) | 5.4 h (4.7×) |
| So2Sat 207-sat | 8.6 h (2.9×) | 3.7 h (6.7×) | 2.0 h (12.8×) |
| So2Sat 117-sat | 14.3 h (1.8×) | 9.2 h (2.8×) | 2.6 h (9.8×) |
| ETCI2021 207-sat | 8.0 h (1.5×) | 11.9 h (2.2×) | 13.6 h (2.5×) |
| ETCI2021 117-sat | 10.5 h (2.2×) | 6.6 h (1.4×) | 14.6 h (3.0×) |

As shown in the above table, ARISE achieves speedups in training at each of the ML tasks.

Ablation studies were also performed in which ARISE was simulated without model aggregation and without imaging data transfer. The following table shows the decreases in test accuracy and the slowdowns in model training relative to the full version of ARISE when the above ablations were performed. The slowdowns in model training were measured in terms of time the ablated version of ARISE took to reach the final test accuracy compared to the full version.

| Dataset & const. | ΔAcc w/o MA | Slowdown w/o MA | ΔAcc w/o DT | Slowdown w/o DT |
|---|---|---|---|---|
| fMoW 207-sat | −7.06% | 1.49× | −6.22% | 1.49× |
| fMoW 117-sat | −13.57% | 2.26× | +0.09% | 1× |
| So2Sat 207-sat | −8.81% | 2.25× | −2.09% | 1.26× |
| So2Sat 117-sat | −4.97% | 1.72× | −3.89% | 1.59× |

As shown in the above table, model aggregation and training data transfer both provide increases in test accuracy and training speed in each of the tested tasks, except that training data transfer does not provide an accuracy or speed increase on the fMoW task at the 117-satellite constellation.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
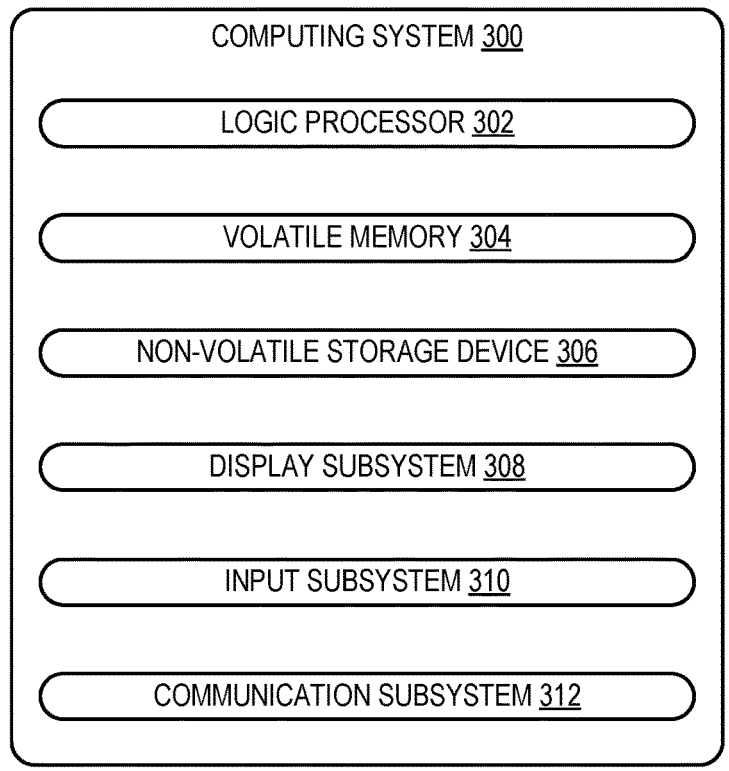
FIG. 11 shows a schematic view of an example computing system at which the computing device of FIG. 1 may be instantiated.

FIG. 11 schematically shows a non-limiting embodiment of a computing system 300 that can enact one or more of the methods and processes described above. Computing system 300 is shown in simplified form. Computing system 300 may embody the computing device 110 described above and illustrated in FIG. 1. Components of computing system 300 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 11.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory, semiconductor memory, and/or magnetic memory, or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry.

Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 300 to send and/or receive messages to and/or from other devices via a network such as the Internet.

The following paragraphs discuss several aspects of the present disclosure. According to one aspect of the present disclosure, a computing device is provided, including a processor configured to receive satellite status data from each of a plurality of satellites included in a satellite constellation. The satellite status data is associated with a time window of a plurality of time windows. The processor is further configured to determine a link topology of the plurality of satellites at the time window. Based at least in part on the satellite status data and the link topology, the processor is further configured to identify a first satellite constellation subset including one or more selected satellite pairs. Identifying the one or more selected satellite pairs includes computing respective link utility values associated with a plurality of candidate pairs of satellites included in the satellite constellation based at least in part on the satellite status data and the link topology. Identifying the one or more selected satellite pairs further includes selecting the one or more selected satellite pairs based at least in part on the link utility values. The processor is further configured to transmit, to the satellites included in the first satellite constellation subset, instructions to perform intersatellite imaging data transfer. The above features may have the technical effect of increasing the accuracy of local copies of a machine learning model trained at the satellites. The above features may also have the technical effect of allowing the local copies to be trained in a shorter amount of time.

According to this aspect, for each of the plurality of satellites, the satellite status data associated with that satellite may include a model staleness value of a local copy of a machine learning model during the time window. The satellite status data may further include a training loss value of the local copy of the machine learning model. The above features may have the technical effect of allowing the processor to instruct satellites with high model staleness and/or high training loss to receive transferred imaging data and perform additional training at their local copies of the machine learning model.

According to this aspect, the processor may be further configured to receive local model update data from the plurality of satellites. The processor may be further configured to update a central copy of the machine learning model based at least in part on the local model update data. The above features may have the technical effect of generating a central copy of the machine learning model that may be used for ground-based inferencing and for updating the satellites' local copies of the machine learning model.

According to this aspect, for each of the plurality of satellites, the satellite status data associated with that satellite may further include a label distribution of a plurality of labels computed at the local copy of the machine learning model during the time window. The above features may have the technical effect of allowing the processor to select the one or more satellite pairs based at least in part on the representativeness of the satellites' label distributions.

According to this aspect, the processor may be configured to compute a plurality of utility values including the link utility values associated with the candidate pairs, respective local data utility values associated with the plurality of satellites, and respective transfer utility values associated with the plurality of candidate pairs. When identifying the one or more selected satellite pairs, the processor may be further configured to compute the local data utility values and the transfer utility values based at least in part on the satellite status data and the link topology. The processor may be further configured to compute the respective link utility value associated with each of the candidate pairs based at least in part on the transfer utility value of the candidate pair and the local data utility value of a candidate recipient satellite included in the candidate pair. The above features may have the technical effect of allowing the processor to select the satellite pairs based at least in part on estimated utilities of using imaging data for local training and of transferring the imaging data.

According to this aspect, the processor may be configured to compute the local data utility values at least in part by, for each of the plurality of satellites computing a first distance between the label distribution and an independent identically distributed (i.i.d.) label distribution. Computing the local data utility value may further include estimating a first number of images stored at the satellite. Computing the local data utility value may further include estimating a second number of the images with which training is configured to be performed at the local copy of the machine learning model during one or more subsequent time windows. The local data utility value may be computed based at least in part on the first distance, the first number, the second number, and a batch size used during training of the local copy of the machine learning model. The above features may have the technical effect of allowing the processor to determine the local data utility values of the satellites based at least in part on the amount of available imaging data and the imaging data's representativeness of an overall distribution.

According to this aspect, the processor may be configured to compute the transfer utility values at least in part by, for each of the plurality of candidate pairs, for the candidate recipient satellite included in the candidate pair, computing a second distance between the label distribution and an independent identically distributed (i.i.d.) label distribution. Computing the transfer utility value may further include computing a third distance between an updated label distribution of the candidate recipient satellite and the i.i.d. label distribution. The updated label distribution may be computed based at least in part on a label distribution of a candidate sender satellite included in the candidate pair and a third number of images transferred from the candidate sender satellite to the candidate recipient satellite. The transfer utility value may be computed based at least in part on the second distance and the third distance. The above features may have the technical effect of allowing the processor to determine the effect of imaging data transfer on training data representativeness when computing the transfer utility values for the candidate pairs.

According to this aspect, the one or more selected satellite pairs may each include a sender satellite and a recipient satellite. The instructions to perform the intersatellite imaging data transfer include instructions to transfer a plurality of images from the sender satellite to the recipient satellite. The above features may have the technical effect of transferring images to recipient satellites that may use the images to train their local copies of the machine learning model with higher accuracy and efficiency.

According to this aspect, the processor may be further configured to transmit, to a second satellite constellation subset including satellites not included in the selected pairs, instructions to perform training at the local copies of the machine learning model respectively stored at the satellites included in the second satellite constellation subset. The above features may have the technical effect of training the copies of the machine learning model using local training data at satellites for which imaging data transfer does not increase performance.

According to this aspect, the processor may be further configured to compute respective local computing utility values associated with the plurality of satellites based at least in part on the satellite status data. The processor may be further configured to identify a model aggregation subset of the satellite constellation based at least in part on the local computing utility values and a time-varying model aggregation threshold. The processor may be further configured to transmit, to satellites included in the model aggregation subset, instructions to aggregate their respective local copies of the machine learning model. The above features may have the technical effect of identifying satellites for which model aggregation would increase the accuracy of their local copies of the machine learning model. The above features may have the further technical effect of instructing the identified satellites to perform model aggregation.

According to this aspect, the processor may be further configured to, for each of a plurality of model aggregation candidate pairs, compute a model aggregation time of the respective local copies of the machine learning model stored at the satellites included in the model aggregation candidate pair. The processor may be further configured to determine whether the model aggregation time is shorter in duration than the time window. The processor may be further configured to identify the model aggregation subset based at least in part on the determinations of whether the model aggregation time is shorter in duration than the time window. The above features may have the technical effect of selecting satellites for model aggregation when the model aggregation is time-efficient to perform.

According to this aspect, the processor may be further configured to compute the model aggregation time least in part by performing a shortest-path tree search over the link topology. The above features may have the technical effect of determining the model aggregation time using the lengths of data transfer paths within the satellite constellation.

According to this aspect, the satellite status data associated with the satellite may further include an amount of memory available at the satellite during the time window and/or an amount of energy available at the satellite during the time window. The above features may have the technical effect of identifying satellite pairs in which the satellites have sufficient memory to receive transferred imaging data and sufficient energy to perform training.

According to this aspect, the satellite status data associated with the satellite may further include a satellite-ground-station link bandwidth and an intersatellite link bandwidth. The above features may have the technical effect of allowing the processor to identify satellites that have sufficient link bandwidth to perform intersatellite data transfer and/or model aggregation.

According to another aspect of the present disclosure, a method for use with a computing device is provided. The method includes receiving satellite status data from each of a plurality of satellites included in a satellite constellation. The satellite status data is associated with a time window of a plurality of time windows. The method further includes determining a link topology of the plurality of satellites at the time window. Based at least in part on the satellite status data and the link topology, the method further includes identifying a first satellite constellation subset including one or more selected satellite pairs. Identifying the one or more selected satellite pairs includes computing respective link utility values associated with a plurality of candidate pairs of satellites included in the satellite constellation based at least in part on the satellite status data and the link topology. Identifying the one or more selected satellite pairs further includes selecting the one or more selected satellite pairs based at least in part on the link utility values. The method further includes transmitting, to the satellites included in the first satellite constellation subset, instructions to perform intersatellite imaging data transfer. The above features may have the technical effect of increasing the accuracy of local copies of a machine learning model trained at the satellites. The above features may also have the technical effect of allowing the local copies to be trained in a shorter amount of time.

According to this aspect, for each of the plurality of satellites, the satellite status data associated with that satellite may include a model staleness value of a local copy of a machine learning model during the time window. The satellite status data may further include a training loss value of the local copy of the machine learning model. The above features may have the technical effect of allowing the processor to instruct satellites with high model staleness and/or high training loss to receive transferred imaging data and perform additional training at their local copies of the machine learning model.

According to this aspect, for each of the plurality of satellites, the satellite status data associated with that satellite may further include a label distribution of a plurality of labels computed at the local copy of the machine learning model during the time window. The above features may have the technical effect of allowing the processor to select the one or more satellite pairs based at least in part on the representativeness of the satellites' label distributions.

According to this aspect, the method may further include computing a plurality of utility values including the link utility values associated with the candidate pairs, respective local data utility values associated with the plurality of satellites, and respective transfer utility values associated with the plurality of candidate pairs. When identifying the one or more selected satellite pairs, the method may further include computing the local data utility values and the transfer utility values based at least in part on the satellite status data and the link topology. The method may further include computing the respective link utility value associated with each of the candidate pairs based at least in part on the transfer utility value of the candidate pair and the local data utility value of a candidate recipient satellite included in the candidate pair. The above features may have the technical effect of allowing the processor to select the satellite pairs based at least in part on estimated utilities of using imaging data for local training and of transferring the imaging data.

According to this aspect, the method may further include computing respective local computing utility values associated with the plurality of satellites based at least in part on the satellite status data. The method may further include identifying a model aggregation subset of the satellite constellation based at least in part on the local computing utility values and a time-varying model aggregation threshold. The method may further include transmitting, to satellites included in the model aggregation subset, instructions to aggregate their respective local copies of the machine learning model.

According to another aspect of the present disclosure, a computing device is provided, including a processor configured to receive satellite status data from each of a plurality of satellites included in a satellite constellation. The satellite status data is associated with a time window of a plurality of time windows. The satellite status data includes, for each satellite of the plurality of satellites, a model staleness value of a local copy of a machine learning model during the time window. The satellite status data for each satellite further includes a label distribution of a plurality of labels computed at the local copy of the machine learning model during the time window. The satellite status data for each satellite further includes one or more respective training loss values received from one or more satellites of the plurality of satellites. The processor is further configured to determine a link topology of the plurality of satellites at the time window. Based at least in part on the satellite status data and the link topology, the processor is further configured to compute respective local computing utility values associated with the plurality of satellites. The processor is further configured to identify a model aggregation subset of the satellite constellation based at least in part on the local computing utility values and a time-varying model aggregation threshold. The processor is further configured to transmit, to satellites included in the model aggregation subset, instructions to aggregate their respective local copies of the machine learning model. The above features may have the technical effect of identifying satellites for which model aggregation would increase the accuracy of their local copies of the machine learning model. The above features may have the further technical effect of instructing the identified satellites to perform model aggregation.

"And/or" as used herein is defined as the inclusive or V, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a processor configured to:
receive satellite status data from each of a plurality of satellites included in a satellite constellation, wherein:
the satellite status data is associated with a time window of a plurality of time windows; and
for each of the plurality of satellites, the satellite status data associated with that satellite includes a label distribution of a plurality of labels computed during the time window;
determine a link topology of the plurality of satellites at the time window;
based at least in part on the satellite status data and the link topology, identify a first satellite constellation subset including one or more selected satellite pairs, wherein identifying the one or more selected satellite pairs includes:
computing respective link utility values associated with a plurality of candidate pairs of satellites included in the satellite constellation based at least in part on the satellite status data and the link topology; and
selecting the one or more selected satellite pairs based at least in part on the link utility values; and
transmit, to the satellites included in the first satellite constellation subset, instructions to perform intersatellite imaging data transfer.

2. The computing device of claim 1, wherein, for each of the plurality of satellites, the satellite status data associated with that satellite includes:
a model staleness value of a local copy of a machine learning model during the time window; and
a training loss value of the local copy of the machine learning model.

3. The computing device of claim 2, wherein the processor is further configured to:
receive local model update data from the plurality of satellites; and
update a central copy of the machine learning model based at least in part on the local model update data.

4. The computing device of claim 1, wherein, for each of the plurality of satellites, the plurality of labels are computed at the local copy of the machine learning model during the time window.

5. The computing device of claim 4, wherein:
the processor is configured to compute a plurality of utility values including the link utility values associated with the candidate pairs, respective local data utility values associated with the plurality of satellites, and respective transfer utility values associated with the plurality of candidate pairs;
when identifying the one or more selected satellite pairs, the processor is further configured to:
compute the local data utility values and the transfer utility values based at least in part on the satellite status data and the link topology; and
compute the respective link utility value associated with each of the candidate pairs based at least in part on the transfer utility value of the candidate pair and the local data utility value of a candidate recipient satellite included in the candidate pair.

6. The computing device of claim 5, wherein the processor is configured to compute the local data utility values at least in part by, for each of the plurality of satellites:
   computing a first distance between the label distribution and an independent identically distributed (i.i.d.) label distribution;
   estimating a first number of images stored at the satellite;
   estimating a second number of the images with which training is configured to be performed at the local copy of the machine learning model during one or more subsequent time windows; and
   computing the local data utility value based at least in part on the first distance, the first number, the second number, and a batch size used during training of the local copy of the machine learning model.

7. The computing device of claim 5, wherein the processor is configured to compute the transfer utility values at least in part by, for each of the plurality of candidate pairs:
   for the candidate recipient satellite included in the candidate pair, computing a second distance between the label distribution and an independent identically distributed (i.i.d.) label distribution;
   computing a third distance between an updated label distribution of the candidate recipient satellite and the i.i.d. label distribution, wherein the updated label distribution is computed based at least in part on:
      a label distribution of a candidate sender satellite included in the candidate pair; and
      a third number of images transferred from the candidate sender satellite to the candidate recipient satellite; and
   computing the transfer utility value based at least in part on the second distance and the third distance.

8. The computing device of claim 1, wherein:
   the one or more selected satellite pairs each include a sender satellite and a recipient satellite;
   the instructions to perform the intersatellite imaging data transfer include instructions to transfer a plurality of images from the sender satellite to the recipient satellite.

9. The computing device of claim 8, wherein the processor is further configured to transmit, to a second satellite constellation subset including satellites not included in the selected pairs, instructions to perform training at the local copies of the machine learning model respectively stored at the satellites included in the second satellite constellation subset.

10. The computing device of claim 1, wherein the processor is further configured to:
   compute respective local computing utility values associated with the plurality of satellites based at least in part on the satellite status data;
   identify a model aggregation subset of the satellite constellation based at least in part on the local computing utility values and a time-varying model aggregation threshold; and
   transmit, to satellites included in the model aggregation subset, instructions to aggregate their respective local copies of the machine learning model.

11. The computing device of claim 10, wherein the processor is further configured to:

for each of a plurality of model aggregation candidate pairs:
   compute a model aggregation time of the respective local copies of the machine learning model stored at the satellites included in the model aggregation candidate pair; and
   determine whether the model aggregation time is shorter in duration than the time window; and
identify the model aggregation subset based at least in part on the determinations of whether the model aggregation time is shorter in duration than the time window.

12. The computing device of claim 11, wherein the processor is further configured to compute the model aggregation time least in part by performing a shortest-path tree search over the link topology.

13. The computing device of claim 1, wherein the satellite status data associated with the satellite further includes:
   an amount of memory available at the satellite during the time window; and/or
   an amount of energy available at the satellite during the time window.

14. The computing device of claim 1, wherein the satellite status data associated with the satellite further includes:
   a satellite-ground-station link bandwidth; and
   an intersatellite link bandwidth.

15. A method for use with a computing device, the method comprising:
   receiving satellite status data from each of a plurality of satellites included in a satellite constellation, wherein:
      the satellite status data is associated with a time window of a plurality of time windows; and
      for each of the plurality of satellites, the satellite status data associated with that satellite includes a label distribution of a plurality of labels computed during the time window;
   determining a link topology of the plurality of satellites at the time window;
   based at least in part on the satellite status data and the link topology, identifying a first satellite constellation subset including one or more selected satellite pairs, wherein identifying the one or more selected satellite pairs includes:
      computing respective link utility values associated with a plurality of candidate pairs of satellites included in the satellite constellation based at least in part on the satellite status data and the link topology; and
      selecting the one or more selected satellite pairs based at least in part on the link utility values; and
   transmitting, to the satellites included in the first satellite constellation subset, instructions to perform intersatellite imaging data transfer.

16. The method of claim 15, wherein, for each of the plurality of satellites, the satellite status data associated with that satellite includes:
   a model staleness value of a local copy of a machine learning model during the time window; and
   a training loss value of the local copy of the machine learning model.

17. The method of claim 15, wherein, for each of the plurality of satellites, the plurality of labels are computed at the local copy of the machine learning model during the time window.

18. The method of claim 17, further comprising:
   computing a plurality of utility values including the link utility values associated with the candidate pairs, respective local data utility values associated with the plurality of satellites, and respective transfer utility values associated with the plurality of candidate pairs; and when identifying the one or more selected satellite pairs:
computing the local data utility values and the transfer utility values based at least in part on the satellite status data and the link topology; and
computing the respective link utility value associated with each of the candidate pairs based at least in part on the transfer utility value of the candidate pair and the local data utility value of a candidate recipient satellite included in the candidate pair.

19. The method of claim 17, further comprising:
computing respective local computing utility values associated with the plurality of satellites based at least in part on the satellite status data;
identifying a model aggregation subset of the satellite constellation based at least in part on the local computing utility values and a time-varying model aggregation threshold; and
transmitting, to satellites included in the model aggregation subset, instructions to aggregate their respective local copies of the machine learning model.

20. A computing device comprising:
a processor configured to:
receive satellite status data from each of a plurality of satellites included in a satellite constellation, wherein:
the satellite status data is associated with a time window of a plurality of time windows; and
the satellite status data includes:
for each satellite of the plurality of satellites, a model staleness value of a local copy of a machine learning model during the time window;
a label distribution of a plurality of labels computed at the local copy of the machine learning model during the time window; and
one or more respective training loss values received from one or more satellites of the plurality of satellites;
determine a link topology of the plurality of satellites at the time window;
based at least in part on the satellite status data and the link topology:
compute respective local computing utility values associated with the plurality of satellites; and
identify a model aggregation subset of the satellite constellation based at least in part on the local computing utility values and a time-varying model aggregation threshold; and
transmit, to satellites included in the model aggregation subset, instructions to aggregate their respective local copies of the machine learning model.

* * * * *